United States Patent [19]

Harada et al.

[11] Patent Number: 5,657,082
[45] Date of Patent: Aug. 12, 1997

[54] IMAGING APPARATUS AND METHOD USING INTERPOLATION PROCESSING

[75] Inventors: Toshiaki Harada; Eiji Yamada, both of Tenri; Tetsuo Iwaki, Yamatokoriyama, all of Japan

[73] Assignee: Sharp Kabushiki Kaisha, Osaka, Japan

[21] Appl. No.: 574,619

[22] Filed: Dec. 19, 1995

[30] Foreign Application Priority Data

Dec. 20, 1994 [JP] Japan ................................... 6-316824

[51] Int. Cl.⁶ ............................................. H04N 9/09
[52] U.S. Cl. ..................... 348/262; 348/264; 348/265; 348/913
[58] Field of Search ................................. 348/222, 262, 348/264, 265, 445, 448, 441, 458, 913; 358/50; H04N 9/09, 9/097, 5/247

[56] References Cited

U.S. PATENT DOCUMENTS

| | | | |
|---|---|---|---|
| 5,099,317 | 3/1992 | Takemura | 348/264 |
| 5,414,465 | 5/1995 | Kodama | 348/264 |

FOREIGN PATENT DOCUMENTS 5-207377  8/1993  Japan .

*Primary Examiner*—Michael H. Lee
*Assistant Examiner*—Sherrie Hsia
*Attorney, Agent, or Firm*—David G. Conlin; William J. Daley, Jr.

[57] ABSTRACT

An imaging apparatus capable of outputting video signals in a plurality of formats is disclosed. The imaging apparatus includes: color separating optical system for separating incident image light into light beams of primary colors; first, second and third imaging portions respectively including a first, second and third set of pixels arranged at regular pitches in a first direction and in a second direction which is perpendicular to the first direction, the first, second and third imaging portion receiving each one of the light beams of primary colors separated by the color separating optical system and respectively accumulating them in the first, second and third set of pixels, as an image signal, the first set of pixels being shifted by ½ pitch with respect to the second and third set of pixels in the first direction and the second direction; an A/D convertor for converting the image signals of primary colors accumulated in the first, second, and third sets of pixels into digital signals; an interpolation processor for performing interpolation processing to the image signals of the primary colors which are converted into the digital signals in the A/D convertor, thereby doubling the number of pixels in the first direction and doubling the number of pixels in the second direction; and a pixel-number convertor for performing format converting processing for converting the image signals of primary colors which are interpolated in the interpolation processor into image signals based on any one of the plurality of formats.

16 Claims, 14 Drawing Sheets

IMAGING APPARATUS AND METHOD USING INTERPOLATION PROCESSING

FIELD OF THE INVENTION

The present invention relates to an imaging apparatus for obtaining an image signal such as a video signal for a video camera, a still image signal for a video still camera, and the like.

DESCRIPTION OF THE RELATED ART

Video signals are easily digitized due to the recent progress of digital signal processing techniques. Digital video tape recorders (VTRs) and other digital apparatuses are becoming increasingly common for home use or personal use. A digital VTR can obtain a video image with a high signal-to-noise (S/N) ratio and with high image quality. Such a digital VTR is superior to an analog VTR in that high-quality editing and the like can be performed because there is no signal deterioration when performing digital dubbing. For these reasons, there has been a strong demand for digital VTRs. In addition, for digital VTRs, a standard definition (SD) format and a high definition (HD) format have been already set, and the specifications thereof have been clearly defined. These formats are advantageous for digital VTRs.

FIG. 15 shows specifications of the SD format, and FIG. 16 shows specifications of the HD format. These formats are different in the number of pixels on each line and the number of lines (the number of scanning lines), and also are different in aspect ratio, i.e., the length-to-width ratio of a screen. In order to obtain video signals of such different formats, it is inherently necessary to use a CCD imaging device or the like which is adapted for each of the systems. Since CCD imaging devices and the like are expensive, a video camera which is adapted for such a plurality of formats is also expensive.

An imaging apparatus which is capable of outputting video signals in a plurality of formats by using a CCD imaging device which is adapted for one type of system has been proposed in Japanese Laid-Open Patent Publication No. 5-207377. Referring to FIG. 17 in the present application, the imaging apparatus includes a CCD imaging device 51, a CCD driving portion 52, and an undesired charge transferring portion 53. The CCD imaging device 51 is an imaging device which complies with a format having the maximum number of pixels among formats which can be output. For example, an imaging device which complies with a high-vision system having about 2,000,000 pixels in total, i.e., 1,920 pixels in the horizontal direction and 1,035 pixels in the vertical direction can be used. The CCD driving portion 52 is a device which sequentially reads signals of respective pixels in a required region of the CCD imaging device 51 by interlace scanning or noninterlace scanning. The undesired charge transferring portion 53 is a device for transferring the charges of undesired pixels in the CCD imaging device 51 during a vertical blanking interval,. and for discarding the charges.

In the case where a video signal for a high-vision system is to be output, the imaging apparatus performs interlace scanning for all of the pixels, i.e., 1,920 pixels in the horizontal direction and 1,035 pixels in the vertical direction of the CCD imaging device 51. In the case where a video signal for a NTSC (National Television System Committee) system is to be output, the imaging apparatus performs the interlace scanning for pixels in a region including 1,370 pixels in the horizontal direction and 984 pixels in the vertical direction of all pixels of the CCD imaging device 51. In such interlace scanning, during the scanning of a first field, for example, the undesired charge transferring portion 53 first transfers and discards the charges accumulated in pixels in each line on the side of a second field. Then, the charges of pixels in each line of the first field are transferred to a vertical transferring portion, and are also sequentially transferred to a horizontal transferring portion, so as to output the charges. In the case of the NTSC system, 550 pixels in the horizontal direction and 51 pixels in the vertical direction are not required, so that the charges of these pixels are also transferred and discarded by the undesired charge transferring portion 23. Accordingly, the imaging apparatus can output video signals in different formats by reading the charges of pixels in an entire region or part of the region of the CCD imaging device 51.

The above-described conventional imaging apparatus which can output video signals in a plurality of formats obtains video signals for different formats by reading pixels in part of the region of the CCD imaging device 51. Thus, it is necessary to use an imaging device which complies with the format having the maximum number of pixels among formats which can be output. As for the CCD imaging device 51 having a large number of pixels which complies, for example, with the high-vision system, the production yield is poor, and the production cost is extremely expensive. As a result, the imaging apparatus is disadvantageously expensive. In the CCD imaging device 51 having a large number of pixels, i.e., 2,000,000 pixels, a light receiving area for each pixel is decreased as compared with a CCD imaging device having a standard number of pixels (e.g., about 400,000 pixels) and having the same optical system as that of the CCD imaging device 51. This results in the reduction of sensitivity and dynamic range.

The above-mentioned problem of the CCD imaging device S1 having a large number of pixels being expensive can be solved by a so-called spatial oblique offset-site pick up method for increasing the number of pixels in the CCD imaging device by a factor of four. The spatial oblique offset-site pick up method can provide the advantage that high resolution can be inexpensively achieved by using a CCD imaging device which is commonly used and has the standard number of pixels.

A so-called spatial oblique offset-site pick up method is a known technique for enhancing the resolution of a CCD imaging device which is inexpensive and has a smaller number of pixels. According to the spatial oblique offset-site pick up method as shown in FIG. 18, the horizontal direction and vertical direction of pixel pitches of CCD imaging devices for respective R, G, and B primary colors can be denoted by dx and dy, respectively. The pixels of the CCD imaging devices for red (R) and blue (B) are shifted by dx/2 in the horizontal direction and by dy/2 in the vertical direction with respected to the pixels of the CCD imaging device for green (G). The reason why the pixels of the CCD imaging device for green are shifted with respect to the pixels of the CCD imaging device for red and blue is that the contributive ratio of a green video signal is substantially the same as the sum of the contributive ratios of red and blue video signals in the generation of a luminance signal. For example, in the NTSC system, the contributive ratios used for producing a luminance signal of green, red, and blue are 0.59, 0.30, and 0.11, respectively interpolation processing is performed among the respective pixels- In the interpolation processing, the number of pixels of the video signal of each color is doubled in the horizontal and vertical directions, respectively, so that the total number of pixels becomes four times as large as the original number of pixels. As shown in FIG. 19, in the interpolation processing, five pixels Sa, Sb, Sc, Sd, and Se are interpolated from four adjacent real pixels S(1, 1), S(2, 1), S(1, 2), and S(2, 2). The sampling values of the pixels Sa to Se are calculated by performing the operation of Expression (1) on the basis of the sampling values of the four real pixels S(1, 1) to S(2, 2).

$$\begin{cases} Sa = \dfrac{S(1,1) + S(2,1)}{2} \\ Sb = \dfrac{S(1,1) + S(1,2)}{2} \\ Sc = \dfrac{S(1,1) + S(1,2) + S(2,1) + S(2,2)}{4} \\ Sd = \dfrac{S(2,1) + S(2,2)}{2} \\ Se = \dfrac{S(1,2) + S(2,2)}{2} \end{cases} \quad (1)$$

The operation of Expression (1) corresponds to linear Lagrangian polynomial interpolation.

As for the video signals of the respective colors having the pixels of which the number is increased by a factor of four as described above, the real pixel of the green video signal is superimposed at the position of pixel Sc which is interpolated in the four real pixels S(1, 1) to S(2, 2) shown in FIG. 19. Similarly, the real pixels of the red and blue video signals are superimposed on the pixels interpolated by the green video signals. As described above, according to the spatial oblique offset-site pick up method, the information between pixels of each color video signal can be compensated for by video signals of the other colors. Thus, it is possible to enhance the horizontal and vertical resolutions as compared with the case where the number of pixels is increased to be four times only by the interpolation processing.

There is an example where a CCD imaging device having a standard number of pixels, e.g., 720 pixels in the horizontal direction and 480 pixels in the vertical direction is used. In such a case, the number of pixels is increased to be four times by the spatial oblique offset-site pick up method, i.e., to be 1440 pixels in the horizontal direction and 960 pixels in the vertical direction. However, the existing format with high resolution is greatly different from the format of the standard number of pixels. Specifically, the number of pixels in the horizontal direction is sufficient, but the number of pixels in the vertical directions is not sufficient, for example, for the HD format including 1,008 pixels in the horizontal direction and 1,024 pixels in the vertical direction. Accordingly, if the CCD imaging device utilizing the spatial oblique offset-site pick up method is used instead of the CCD imaging device 51 having the large number of pixels in the conventional imaging apparatus, the imaging apparatus cannot accommodate the existing format for high resolution.

In addition, the spatial oblique offset-site pick up method uses linear Lagrangian polynomial interpolation, as described above. Accordingly, as shown in Expression (1), the pixels Sa and Se which are interpolated only in the horizontal direction and the pixels Sb and Sd which are interpolated only in the vertical direction, as shown in FIG. 19, are interpolated using only the adjacent two real pixels S(1, i) and S(2, 1), and the like. Therefore, for example, in an oblique edge portion of the image, the color of the real pixel on which respective pixels are superimposed is different from the color of the interpolated pixel. This may result in a problem of undesired color variations.

SUMMARY OF THE INVENTION

The imaging apparatus of this invention, includes:

a color separating optical system for separating incident image light into light beams of primary colors;

a first imaging portion including a first set of a plurality of pixels arranged at intervals of Ph (Ph is a positive real number) in a first direction and at intervals of Pv (Pv is a positive real number) in a second direction which is perpendicular to the first direction, the first imaging portion receiving one of the light beams of the primary colors separated by the color separating optical system and accumulating the received light beam in the first set of the plurality of pixels as an image signal;

a second imaging portion and a third imaging portion including a second set of a plurality of pixels and a third set of a plurality of pixels arranged at intervals of Ph (Ph is a positive real number) in the first direction and at intervals of Pv (Pv is a positive real number) in the second direction, respectively, the second and third sets of the plurality of pixels being shifted by Ph/2 pitch with respect to the first set of the plurality of pixels in the first direction and shifted by Pv/2 pitch with respect to the first set of the plurality of pixels in the second direction, the second and third imaging portions receiving the remaining two light beams of the primary colors separated by the color separating optical system and accumulating the received light beams in the second and third sets of the plurality of pixels, respectively, as image signals;

an A/D converting section for converting the image signals of the primary colors accumulated in the first, second, and third sets of the plurality of pixels into digital signals;

an interpolation processing section for performing interpolation processing on the image signals of the primary colors which are converted into the digital signals in the A/D converting section, thereby doubling the number of pixels in the first direction and doubling the number of pixels in the second direction; and a pixel-number converting section for performing format converting processing for converting the image signals of the primary colors which are interpolated in the interpolation processing section into image signals based on any one of the plurality of formats.

In one embodiment of the invention, the pixel-number converting section performs at least one of processing for converting the numbers of pixels in the first and second directions, and processing for converting an aspect ratio of an image by trimming or by adding a predetermined signal to an outside of an image area represented by the first, second, and third sets of the plurality of pixels, thereby performing the format converting processing for converting the image signals of the primary colors into the image signals based on any one of the plurality of formats.

In another embodiment of the invention, the interpolation processing section performs the interpolation processing by using a linear Lagrangian polynomial.

In still another embodiment of the invention, the interpolation processing section performs the interpolation processing by using a quadratic Lagrangian polynomial.

In still another embodiment of the invention, the interpolation processing section performs the Interpolation processing by using a third-degree or higher-degree of Lagrangian polynomial.

In still another embodiment of the invention, the pixel-number converting section performs the processing for converting the number of pixels by using a Lagrangian polynomial.

In still another embodiment of the invention, the pixel-number converting section includes:

pixel supplying means for sequentially supplying pixels in each line among pixels arranged along the first direction in respective lines which are successively disposed in the second direction, as specific pixels, and for supplying nx(n+2) delayed pixels for each of the specific pixels, the nx(n+2) delayed pixels including n delayed pixels which are delayed by 1 line to n lines, respectively, with respect to the specific pixel, and nx(n+1) delayed pixels which are delayed by 1 column to n columns, respectively, with respect to the n delayed pixels which are delayed by 1 line to n lines, n being an integer of 2 or more;

operation means for obtaining interpolation pixels by using n-degree of Lagrangian polynomial by multiplying the specific pixel and the delayed pixels for the specific pixel by coefficients, respectively, and by adding the multiplied pixels; and coefficient supplying means for supplying the respective coefficients to the operation means at a predetermined period.

In still another embodiment of the invention, the imaging apparatus further includes: at least one selection means selected from selection means for determining whether interpolation processing is to be performed in the interpolation processing section or not for the image signals of the primary colors which are converted into the digital signals in the A/D converting section, and selection means for determining whether format converting processing is to be performed An the pixel-number converting section or not for the image signals of the primary colors which are interpolated in the interpolation processing section.

The imaging method of this invention includes: the steps of:

separating incident image light into light beams of primary colors;

accumulating one of the separated light beams of the primary colors in a first set of a plurality of pixels arranged at intervals of Ph (Ph is a positive real number) in a first direction and at intervals of Pv (Pv is a positive real number) in a second direction which is perpendicular to the first direction, as an image signal;

accumulating the remaining two of the separated light beams of the primary colors in a second set of a plurality of pixels and a third set of a plurality of pixels arranged at intervals of Ph (Ph is a positive real number) in the first direction and at intervals of Pv (Pv is a positive real number) in the second direction, respectively, the second and third sets of the plurality of pixels being shifted by Ph/2 pitch with respect to the first set of the plurality of pixels in the first direction and shifted by Pv/2 pitch with respect to the first set of the plurality of pixels in the second direction, as image signals;

A/D converting the image signals of the primary colors accumulated in the first, second, and third sets of the plurality of pixels into digital signals;

performing interpolation processing on the image signals of the primary colors which are converted into the digital signals, thereby doubling the number of pixels in the first direction and doubling the number of pixels in the second direction; and performing format converting processing for converting the interpolated image signals of the primary colors into image signals based on any one of the plurality of formats.

In one embodiment of the invention, the step of performing the format converting processing includes at least one of processing for converting the numbers of pixels in the first and second directions, and processing for converting an aspect ratio of an image by trimming or by adding a predetermined signal to an outside of an image area represented by the first, second, and third sets of the plurality of pixels.

In another embodiment of the invention, the step of performing the interpolation processing performs the interpolation processing by using a linear Lagrangian polynomial.

In still another embodiment of the invention, the step of performing the interpolation processing performs the interpolation processing by using a quadratic Lagrangian polynomial.

In still another embodiment of the invention, the step of performing the interpolation processing performs the interpolation processing by using a third-degree or higher-degree of Lagrangian polynomial.

In still another embodiment of the invention, the step of performing the format converting processing performs the processing for converting the number of pixels by using a Lagrangian polynomial.

In still another embodiment of the invention, the step of performing the format converting processing includes:

a pixel supplying step of sequentially supplying pixels in each line among pixels arranged along the first direction in respective lines which are successively disposed in the second direction, as specific pixels, and of supplying nx(n+2) delayed pixels for each of the specific pixels, the nx(n+2) delayed pixels including n delayed pixels which are delayed by 1 line to n lines, respectively, with respect to the specific pixel, and nx(n+1) delayed pixels which are delayed by 1 column to n columns, respectively, with respect to the n delayed pixels which are delayed by 1 line to n lines;

an operation step of obtaining interpolation pixels by using n-degree of Lagrangian polynomial by multiplying the specific pixel and the delayed pixels for the specific pixel by coefficients, respectively, and by adding the multiplied pixels; and a coefficient supplying step of supplying the respective coefficients to the interpolated pixels at a predetermined period.

In still another embodiment of the invention, the imaging method further includes: at least one step selected from the step of determining whether interpolation processing is to be performed in the step of performing the interpolation processing or not for the image signals of the primary colors which are converted into the digital signals in the A/D converting step, and the step of determining whether format converting processing is to be performed in the step of performing the format converting processing or not for the image signals of the primary colors which are interpolated in the step of performing the interpolation processing.

A color-separation optical system separates incident image light into light beams of three primary colors, i.e., R, G, and B (red, green, and blue). The invention employs a three-plate type imaging apparatus in which the separated incident image light beams of respective colors are received by individual imaging portions. Pixels in the first imaging portion are shifted by ½ in the horizontal direction and the vertical direction from pixels in the second and third imaging portions. Accordingly, on each of image signals imaged by these imaging portions, a pixel imaged by the first imaging portion is positioned at the center of four adjacent pixels imaged by the second and third imaging portions. In general, the first imaging portion images the green (G) incident image light which most contributes to a luminance signal.

The image signals imaged by the respective imaging portions are converted into digital signals in an A/D converting section, and processed by interpolation so as to double the number of pixels in the horizontal direction and in the vertical direction in the interpolation processing section. That is, one pixel is interpolated between two pixels which are adjacent in each of the horizontal and vertical directions, and one pixel is interpolated at the center of four adjacent pixels. At this time, if the same interpolation processing is performed for image signals which are imaged without shifting the pixels, the interpolation processing only increases the number of pixels, so that the resolution cannot be enhanced. However, in the present invention, the pixel interpolated at the center of four adjacent pixels in the image signals imaged by the second and third imaging portions overlaps the real pixel in the image signal imaged by the first imaging portion, so that the resolution can be enhanced by a so-called spatial oblique offset-site pick up method.

The image signals which are processed by interpolation in the interpolation processing section are then processed by format conversion in a pixel-number converting section. In the format converting processing, the number of pixels in each line and the number of lines are converted by performing the pixel-number converting processing in the horizontal direction and in the vertical direction. At this time, except for the case where the number of pixels is decreased to be a fraction of an integer, the interpolation processing of pixels is performed at appropriate positions between pixels. In the format converting processing, the aspect ratio is also converted by trimming or by adding a predetermined signal to the outside of the image area. By performing both or either of the conversion of the number of pixels in each line and the number of lines and the conversion of the aspect ratio, the image signals are converted into image signals of any one of a plurality of formats. However, in some of the plurality of formats, neither the conversion of the number of pixels in each line and the number of lines nor the conversion of the aspect ratio are performed. In the conversion of the number of pixels in each line and the number of lines and the conversion of the aspect ratio, time-axis correcting processing is also performed so as to match the time axis of the image signals with the transmission rate.

As a result, according to the invention, by the spatial oblique offset-site pick up method, it is possible to enhance the resolution of image signals by using inexpensive imaging devices as the imaging portions. In each of the imaging portions, it is possible to increase the amount of light received by each pixel and hence to enhance the sensitivity. In addition, by performing the pixel-number converting processing and the like for the thus obtained image signals of high resolution, it is possible to select and output image signals in a plurality of formats.

In one embodiment of the invention, the interpolation processing by the interpolation processing section is performed using linear Lagrangian polynomial interpolation. Linear Lagrangian polynomial interpolation is used for performing the interpolation based on four adjacent pixels, so that it is possible to simplify the configuration of a circuit for the operation or the construction of the program.

However, if the interpolation processing by the spatial oblique offset-site pick up method is performed by linear Lagrangian polynomial interpolation, color variations are undesirably caused in an oblique edge portion of an image.

Accordingly, in a preferred embodiment of the invention, the interpolation processing is performed by a quadratic or higher-degree Lagrangian polynomial interpolation. Quadratic Lagrangian polynomial interpolation is used for performing the interpolation based on nine adjacent pixels. Accordingly, in the interpolation in the horizontal direction or in the vertical direction, there is no instance where the interpolation is performed only based on adjacent two pixels, so that it is possible to suppress the occurrence of color variation in the oblique edge portion of the image. In the case of quadratic or higher-degree Lagrangian polynomial interpolation, when the degree is assumed to be an n-th degree, the interpolation is performed based on $(n+1)^2$ pixels, where $(n+1)^2$ is 9 or more. Therefore, it is also possible to suppress the occurrence of color variations.

In the invention, the pixel-number converting section performs the pixel-number converting processing by using Lagrangian polynomial interpolation. In the general pixel-number converting processing, a pixel having the sampling value of 0 is interpolated at a proper position between pixels, and then allowed to pass through a lowpass filter. Thereafter, the pixels are decimated, so as to perform the conversion of the number of pixels. However, the interpolation of pixels may cause an increase in a sampling frequency, so that it is necessary to increase the processing rate. In the filtering processing using the lowpass filter, a plurality of preceding and succeeding pixels of each pixel in the horizontal and vertical directions are multiplied by a filter coefficient, respectively, and then added to each other. The number of preceding and succeeding pixels of each pixel is increased in accordance with the degree of the lowpass filter, and the number of pixels is also increased by the interpolation. As a result, it can be necessary to perform a large amount of operation. For this reason, the pixel-number converting processing can be time consuming in an inexpensive imaging apparatus. Accordingly, the invention preferably utilizes the Lagrangian polynomial interpolation which does not necessitate the pixel interpolation processing, so as to perform the interpolation of the pixels which are required after the conversion. Therefore, the configuration of a circuit for the operation of the pixel-number converting processing, or the construction of a program can be inexpensive and simple, so that the processing can be performed at a low rate.

The invention includes selection means which can determine whether the interpolation processing in the interpolation processing section and the format converting processing in the pixel-number converting section are to be performed or not. By the selection means, for example, unnecessary signal processing can be omitted. It is also possible to widen the variation of formats which can be output.

Thus, the invention described herein makes possible the advantage of providing an imaging apparatus in which the number of pixels can be inexpensively increased by a factor of four by the spatial oblique offset-site pick up method, and image signals complying with a plurality of desired formats can be obtained by the conversion of the number of pixels.

These and other advantages of the present invention will become apparent to those skilled in the art upon reading and understanding the following detailed description with reference to the accompanying figures.

DESCRIPTION OF THE PREFERRED EMBODIMENTS

Hereinafter, the invention will be described by way of examples with reference to the accompanying drawings.

EXAMPLE 1

Figure 1:
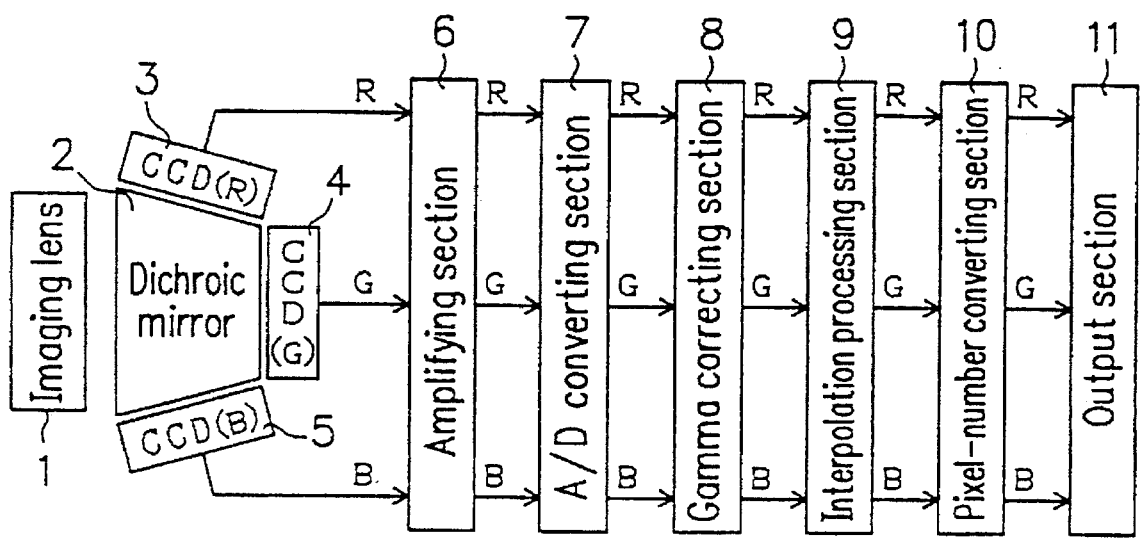
FIG. 1 is a block diagram showing a construction of an imaging apparatus of Example 1 according to the invention.

Referring to FIG. 1, an imaging apparatus of this example includes an imaging lens 1, a dichroic mirror 2, and three CCD imaging devices 3, 4, and 5. The imaging lens i is an optical system for imaging incident image light from an object to be imaged on light receiving faces of the respective CCD imaging devices 3 to 5. The dichroic mirror 2 is an optical system for separating the incident image light which is incident thereon through the imaging lens 1 into light beams of three primary colors of R, G, and B by a blue-reflective dichroic film and a red-reflective dichroic film, and for sending the separated light beams to the CCD imaging devices 3 to 5, respectively. Each of the CCD imaging devices 3 to 5 is a solid-state imaging device utilizing a charge coupled device (CCD) which converts the incident image light beam of the corresponding color sent from the dichroic mirror 2 into an electric signal, and outputs the electric signal as an image signal (a video signal). The CCD imaging device 3 receives the red image light beam, and outputs a red (R) image signal. The CCD imaging device 4 receives the green image light beam, and outputs a green (G) image signal. The CCD imaging device 5 receives the blue image light beam, and outputs a blue (B) image signal.

Each of the CCD imaging device 3 to 5 is a device which is commonly used and inexpensive, and has the standard number of pixels for the SD format, i.e., 720 pixels in the horizontal direction and 480 pixels in the vertical direction. The pixels in the CCD imaging devices 3 and 5 for red (R) and blue (B) are shifted by ½ of a pixel in the horizontal and vertical directions, respectively, with respect to the pixels in the CCD imaging device 4 for green (G). In some CCD imaging devices, in order to perform interlace scanning, signal charges of respective pixels are added to each other, and then the sum of the signal charges is read out. However, the CCD imaging apparatus which is employed in this invention is of a progressive scan type in which signal charges of all pixels are directly read out by noninterlace scanning.

The image signals of respective colors output from the CCD imaging devices 3 to 5 are fed to a gamma correcting section 8 via an amplifying section 6 and an A/D converting section 7. The amplifying section 6 performs a correlated double sampling, automatic gain control, and amplifying processing of a signal level for each of the image signals. The A/D converting section 7 converts each of the image signals which are analog signals output from the amplifying section 6 into a digital signal. The gamma correcting section 8 performs gamma correction for each of the image signals which have been converted into digital signals. Gamma correction is the processing in which respective image signals are multiplied by coefficients for correcting the nonlinearity of gray scales (color gradation) due to the photoelectric converting characteristics of the CCD imaging devices 3 to 5.

The image signals output from the gamma correcting section 8 are fed to an interpolation processing section 9. The interpolation processing section 9 performs the interpolation processing by using the spatial oblique offset-site pick up method. The interpolation processing section 9 performs the interpolation processing in which the number of pixels in each image signal in the horizontal direction and in the vertical direction is doubled, respectively, by the interpolation between pixels. Thus, the number of pixels is increased by a factor of four. Specifically, 720 pixels in the horizontal direction and 480 pixels in the vertical direction output from each of the CCD imaging devices 3 to 5 are increased to be 1,440 pixels in the horizontal direction and 960 pixels in the vertical direction. The interpolation between pixels is performed using Lagrangian polynomial interpolation which will be described later in detail. When the number of pixels is increased by a factor of four as described above, pixels which are interpolated among four adjacent real pixels in each image signal overlap real pixels in the image signal of another color. Accordingly, unlike the case where the number of pixels is simply increased, the resolution can be enhanced.

Figure 2:
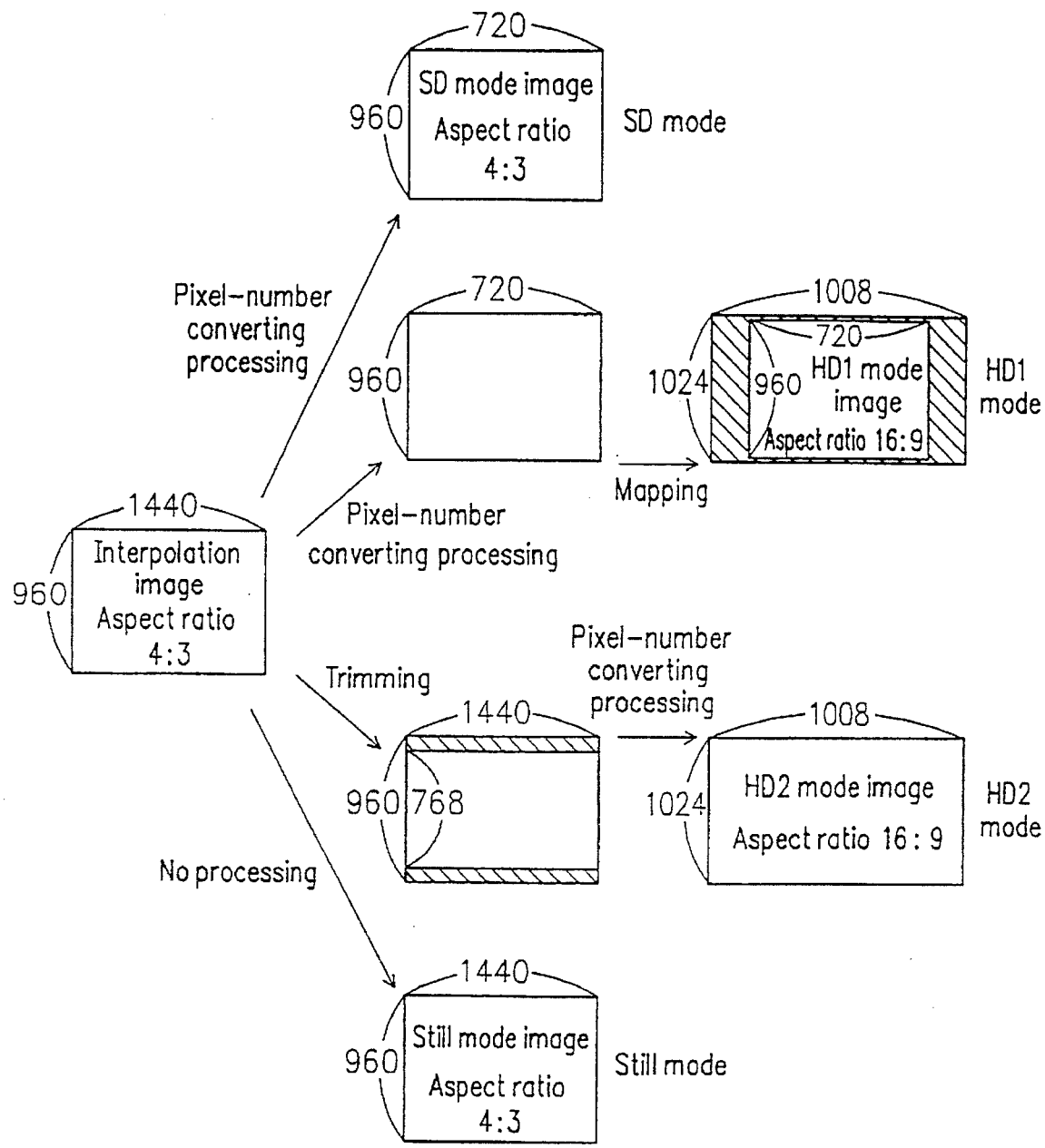
FIG. 2 is a diagram illustrating the pixel-number converting processing in four kinds of modes in Example 1 according to the invention.

The image signals interpolated by the interpolation processing section 9 are fed to a pixel-number converting section 10. The pixel-number converting section 10 performs a format converting processing including a pixel-number converting processing and an aspect-ratio converting processing. The pixel-number converting section 10 can perform one of the format converting processing and the aspect-ratio converting processing. The pixel-number converting section 10 can perform none of the processings. In the pixel-number converting processing, the number of pixels in the horizontal direction and in the vertical direction in each image signal is converted, so as to convert the number of pixels in each line and the number of lines. In general, it is necessary to perform the interpolation of pixels at appropriate positions. For this reason, the example utilizes Lagrangian polynomial interpolation for the interpolation. The aspect-ratio converting processing is the processing for converting the aspect ratio by performing trimming for cutting part of an image area and by adding appropriate signals to the outside of the image area. When the trimming or the signal addition is performed, the number of pixels is also changed. In the pixel-number converting processing and the aspect-ratio converting processing, the processing for correcting the time axis is also performed in order to match the time axis of the image signal with the transmission rate. The pixel-number converting processing and the aspect-ratio converting processing are performed in accordance with a conversion mode which is set in the imaging apparatus. As shown in FIG. 2, one of the four kinds of modes, i.e., an SD mode, an HD1 mode, an HD2 mode, and a still mode can be set as the conversion mode. However, among these conversion modes, the aspect-ratio converting processing is not performed in some cases.

The SD mode is a mode corresponding to the SD format having 720 pixels in the horizontal direction and 480 pixels in the vertical direction, and having aspect ratio of 4:3. Each image signal having 1440 pixels in the horizontal direction and 960 pixels in the vertical direction which are interpolated by the interpolation processing section 9, and having the aspect ratio of 4:3, is converted into an image signal having 720 pixels in the horizontal direction and 960 pixels in the vertical direction and having the same aspect ratio. In the pixel-number conversion in this mode, only the number of pixels in each line is decreased by ½. Accordingly, the number of pixels (the number of lines) in the vertical direction of each image signal after the conversion is not changed, i.e., 960 pixels. However, the 960 pixels in the vertical direction are decreased to be 480 pixels at the output, which will be described later.

The HD1 mode is a mode corresponding to the HD format having 1,008 pixels in the horizontal direction and 1,024 pixels in the vertical direction, and having an aspect ratio of 16:9. In the pixel-number converting processing, each image signal is converted into an image signal having 720 pixels in the horizontal direction and 960 pixels in the vertical direction which are the same as those in the SD format, and having the aspect ratio of 4:3. The image signal after the pixel-number conversion is mapped onto the original image of the HD format. Specifically, the aspect ratio is converted into 16:9 by adding a plain signal of a background color to the hatched area shown in FIG. 2.

The HD2 mode is a mode corresponding to the original HD format. In this case, upper and lower hatched areas shown in FIG. 2 are cut from the image signal having 1,440 pixels in the horizontal direction and 960 pixels in the vertical direction and having an aspect ratio of 4:3. Then, trimming is performed so as to obtain an image signal having 1,440 pixels in the horizontal direction and 768 pixels in the vertical direction and having an aspect ratio of 16:9. Thereafter, the pixel-number conversion is performed so as to obtain an image signal of the HD format having 1,008 pixels in the horizontal direction and 1,024 pixels in the vertical direction. In the pixel-number conversion in this mode, the operation for decreasing the number of pixels in each line from every 10 pixels to 7 pixels is performed in the horizontal direction, and the operation for increasing the number of lines from every 3 lines to 4 lines is performed in the vertical direction.

The still mode is a format for obtaining a still image. In this case, each image signal having 1,440 pixels in the horizontal direction and 960 pixels in the vertical direction which are interpolated by the interpolation processing section 9 and having an aspect ratio of 4:3 is directly output without performing any conversion. That is, the still mode is the original mode in the imaging apparatus of the invention, so that the aspect-ratio converting processing as well as the pixel-number converting processing is not performed. The still mode gets the most out of the effect of enhancing the resolution by the spatial oblique offset-side pick up method.

Figure 3:
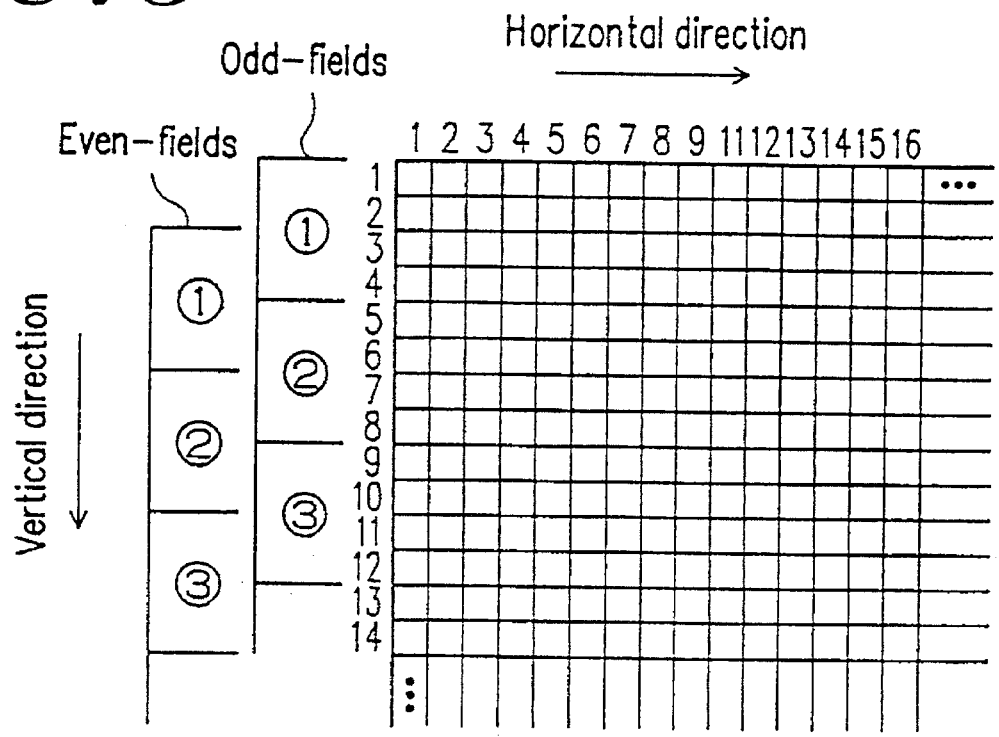
FIG. 3 is a diagram showing the scanning in an output portion in an SD mode in Example 1 according to the invention.

The image signals after the format converting processing in the pixel-number converting section 10 are fed to an output section 11, as shown in FIG. 1. The output section 11 outputs the image signals to the outside in accordance with the respective mode. Specifically, in the SD mode, as shown in FIG. 3, pixels in four successive lines in each odd fields are added and averaged, and then output. In each even field, pixels in four lines which overlap two lines in each of previous and next odd-numbered fields are added and averaged, and then output. Thus, the interlace scanning is performed, and the number of pixels is decreased from 960 to 480 in the vertical direction per frame. A luminance signal (a Y signal) and color difference signals including a B-Y signal and an R-Y signal are generated from respective image signals of the primary colors, i.e., R, G, and B. Then, in order to satisfy Recommendation 601 "4:2:2 component encoding system" by the Consultative Committee of International Radio Communications, the luminance signal is transmitted at 13.5 MHz, the color difference signal of the B-Y signal is transmitted at 6.75 MHz, and the color difference signal of the R-Y signal is transmitted at 6.75 MHz.

Figure 4:
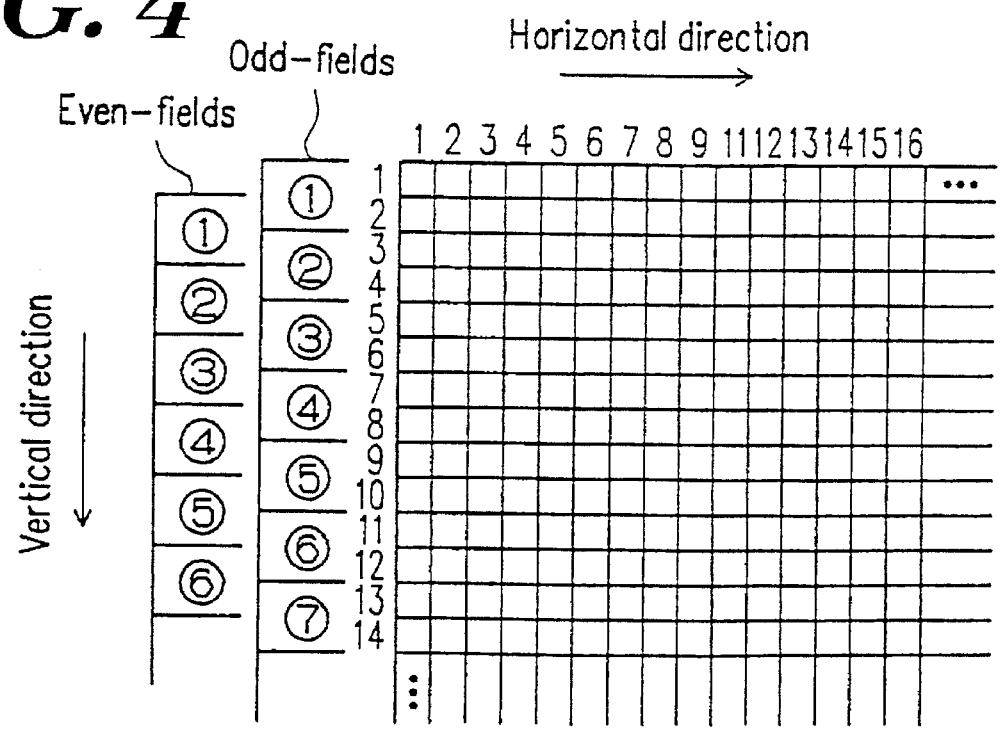
FIG. 4 is a diagram showing the scanning in the output portion in an HD1 mode and an HD2 mode in Example 1 according to the invention.

In the HD1 mode and the HD2 mode, as shown in FIG. 4, pixels in two successive lines in each odd field are added and averaged, and then output. In each even field, pixels in two lines which overlap one line in each of previous and next odd fields are added and averaged, and then output. Thus, the interlace scanning is performed. A luminance signal (a Y signal) and color difference signals including a B-Y signal and an R-Y signal are generated from respective image signals of the primary colors, i.e., R, G, and B. In order to satisfy "12:4:0 component encoding system", the luminance signal is transmitted at 40.5 MHz, and the color difference signals are transmitted at 13.5 MHz. The B-Y signal and the R-Y signal of the color difference signals are processed by time division multiplexing for each line.

In the still mode, the image signals of the three primary colors, i.e., R, G, and B are directly output as line-sequential RGB data. The RGB data is fed to a computer, a video printer, or the like via a digital interface, and the RGB data is processed by image processing, and displayed or printed.

Figure 5:
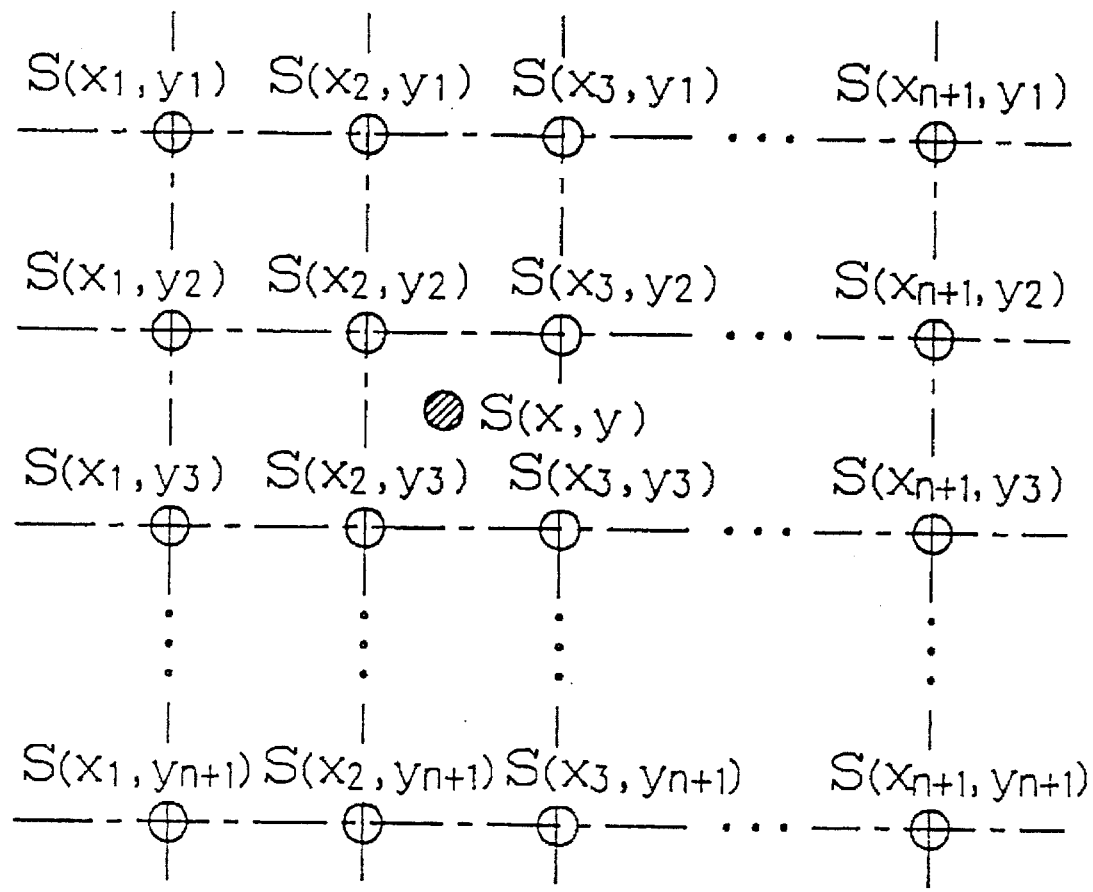
FIG. 5 is a diagram showing pixels which are used for Lagrangian polynomial interpolation of n degrees in Example 1 according to the invention.

The Lagrangian polynomial interpolation used in the interpolation processing by the interpolation processing section 9, and in the pixel-number converting processing by the pixel-number converting section 10 will be described. The Lagrangian polynomial interpolation of n degrees obtains an interpolation value for a pixel S(x, y) at an arbitrary position, based on the sampling values of (n+1) pixels S(x1, y1) to S(xn+1, yn+1) in each of the horizontal and vertical directions as shown in FIG. 5. In this case, the Lagrangian polynomial in the x direction as the horizontal direction is expressed by Expression (2):

$$Li(x) = \prod_{\substack{j=1 \\ j \neq i}}^{n+1} \frac{x - x_j}{x_i - x_j} \qquad (2)$$

The Lagrangian polynomial in the y direction is expressed by Expression (3):

$$Li(y) = \prod_{\substack{j=1 \\ j \neq i}}^{n+1} \frac{y - y_j}{y_i - y_j} \qquad (3)$$

In the above expressions, i denotes an integer selected from 1 to n+1, and corresponds to each column in the x direction and each line in the y direction. Accordingly, the interpolation value of the pixel S(x, y) can be obtained from the matrix in Expression (4):

$$S(x,y) = (L_1(y)L_2(y) \ldots L_{n+1}(y)) \begin{pmatrix} S(x_1,y_1) & S(x_2,y_1) & \ldots & S(x_{n+1},y_1) \\ S(x_1,y_2) & S(x_2,y_2) & \ldots & S(x_{n+1},y_2) \\ S(x_1,y_3) & S(x_2,y_3) & \ldots & S(x_{n+1},y_3) \\ \vdots & \vdots & & \vdots \\ S(x_1,y_{n+1}) & S(x_2,y_{n+1}) & \ldots & S(x_{n+1},y_{n+1}) \end{pmatrix} \begin{pmatrix} L_1(x) \\ L_2(x) \\ L_3(x) \\ \vdots \\ L_{n+1}(x) \end{pmatrix} \qquad (4)$$

Figure 6:
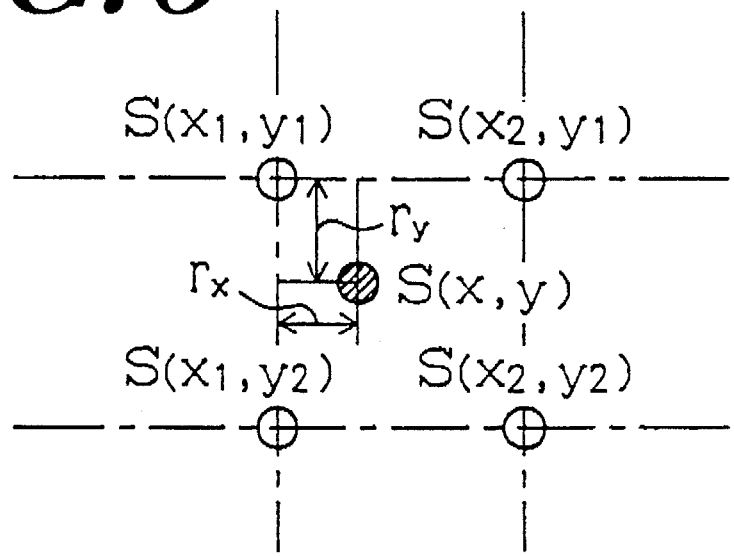
FIG. 6 is a diagram showing pixels which are used for linear Lagrangian polynomial interpolation in Example 1 according to the invention.

From the above description, the linear Lagrangian polynomial interpolation obtains the interpolation value of the pixel S(x, y), based on the interpolation values of four pixels S(x1, y1) to S(x2, y2) shown in FIG. 6. Herein, a distance in the x direction from the pixel S(x, y) to the pixel S(x1, y1) is denoted by rx, and a distance in the y direction is denoted by ry. The Lagrangian polynomial in the x direction is expressed by Expression (5) from Expression (2):

$$\begin{cases} L_1(x) = \frac{x - x_2}{x_1 - x_2} = 1 - rx = K_1 \\ L_2(x) = \frac{x - x_1}{x_2 - x_1} = rx = K_2 \end{cases} \qquad (5)$$

The Lagrangian polynomial in the y direction is expressed by Expression (6) from Expression (3):

$$\begin{cases} L_1(y) = \frac{y - y_2}{y_1 - y_2} = 1 - ry = K_3 \\ L_2(y) = \frac{y - y_1}{y_2 - y_1} = ry = K_4 \end{cases} \qquad (6)$$

Herein, the distance between columns and the distance between lines are set to be 1, respectively, and the Lagrangian polynomials are expressed by using the distances rx and ry. The Lagrangian polynomials are assigned to coefficients K1 to K4, respectively. The coefficients K1 to K4 have the relationships of K1+K2=1, and K3+K4=1. The interpolation value of the pixel S(x, y) can be obtained by the matrix of Expression (7):

$$\begin{aligned} S(x,y) &= (1 - ry\,ry)\begin{pmatrix} S(1,1)S(2,1) \\ S(1,2)S(2,2) \end{pmatrix}\begin{pmatrix} 1 - rx \\ rx \end{pmatrix} \\ &= (1 - rx)(1 - ry)S(1,1) + (1 - rx)ryS(1,2) + \\ & \quad rx(1 - ry)S(2,1) + rx\,ryS(2,2) \\ &= K_3(K_1S(1,1) + K_2S(2,1)) + K_4(K_1S(1,2) + K_2S(2,2)). \end{aligned} \qquad (7)$$

Expression (7) includes an equation obtained by developing a matrix, and an equation in which the equation is expressed by using the coefficients K1 to K4.

Figure 19:
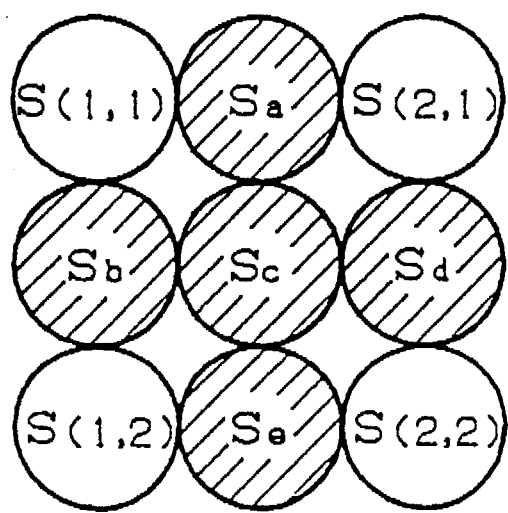
FIG. 19 is a diagram showing interpolation processing of pixels by the spatial oblique offset-site pick up method in the prior art.

If it is assumed that the pixel Sc shown in FIG. 19 is the pixel S(x, y) to be interpolated, the distances rx and ry and the coefficients K1 to K4 are respectively expressed by Expression (8):

$$r_x = r_y = \tfrac{1}{2}\, K_1 = K_2 = K_3 = K_4 = \tfrac{1}{2} \qquad (8)$$

If the expression is substituted into Expression (7), the interpolation value of the pixel S(x, y) is expressed by Expression (9):

$$S(x,y) = \frac{S(1,1) + S(2,1) + S(1,2) + S(2,2)}{4} \qquad (9)$$

If it is assumed, for example, that the pixel Sa is the pixel S(x, y) to be interpolated, the distances rx and ry and the coefficients K1 to K4 are respectively expressed by Expression (10).

$$\begin{cases} rx = \tfrac{1}{2}\ ry = 0 \\ K_1 = K_2 = \tfrac{1}{2}\ K_3 = 1\ K_4 = 0 \end{cases} \qquad (10)$$

If the expression is substituted into Expression (7), the interpolation value of the pixel S(x, y) is expressed by Expression (11):

$$S(x,y) = \frac{S(2,1) + S(1,1)}{2} \qquad (11)$$

When similar calculations are performed, the interpolation values of the pixels Sa to Se which are obtained on the basis of Expression (7) are identical with those in Expression (1). As a result, it is found that linear Lagrangian polynomial interpolation has been conventionally used in the interpolation processing by the spatial oblique offset-site pick up method.

Figure 7:
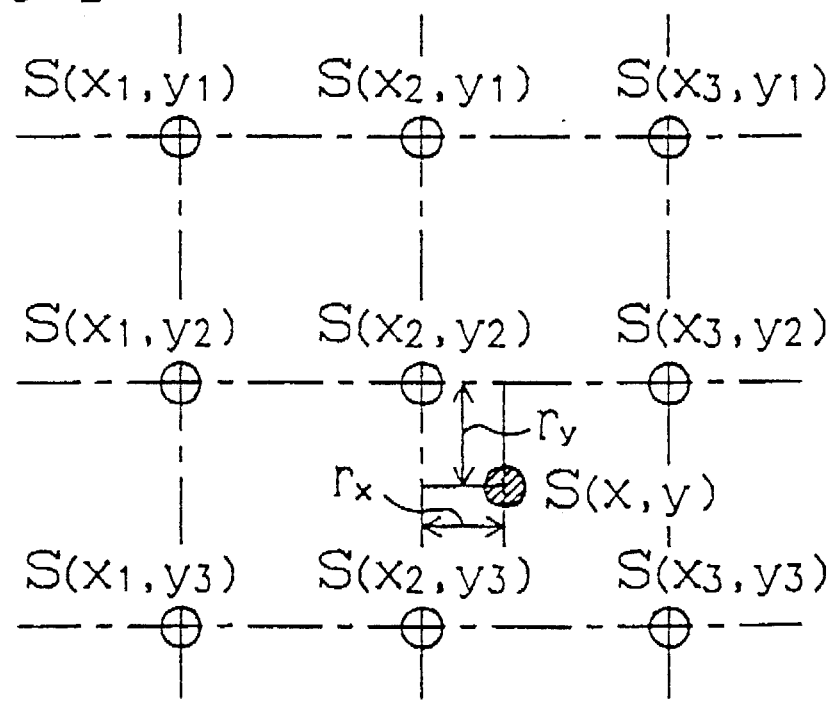
FIG. 7 is a diagram showing pixels which are used for quadratic Lagrangian polynomial interpolation in Example 1 according to the invention.

Next, in the case of quadratic Lagrangian polynomial interpolation, the interpolation Values of the pixel S(x, y) are obtained based on the sampling values of nine pixels S(x1, y1) to S(x3, y3) shown in FIG. 7. Herein, the distances from the pixel S(x, y) to the pixel S(x2, y2) are denoted by rx and ry, respectively. The Lagrangian polynomial in the x direction is expressed by Expression (12):

$$\begin{cases} L_1(x) = \dfrac{x-x_2}{x_1-x_2} \cdot \dfrac{x-x_3}{x_1-x_3} = \dfrac{r_x(r_x-1)}{2} \\ L_2(x) = \dfrac{x-x_1}{x_2-x_1} \cdot \dfrac{x-x_3}{x_2-x_3} = -(r_x+1)(r_x-1) \\ L_3(x) = \dfrac{x-x_1}{x_3-x_1} \cdot \dfrac{x-x_2}{x_3-x_2} = \dfrac{r_x(r_x+1)}{2} \end{cases} \quad (12)$$

The Lagrangian polynomial in the y direction is expressed by Expression (13):

$$\begin{cases} L_1(y) = \dfrac{y-y_2}{y_1-y_2} \cdot \dfrac{y-y_3}{y_1-y_3} = \dfrac{r_y(r_y-1)}{2} \\ L_2(y) = \dfrac{y-y_1}{y_2-y_1} \cdot \dfrac{y-y_3}{y_2-y_3} = -(r_y+1)(r_y-1) \\ L_3(y) = \dfrac{y-y_1}{y_3-y_1} \cdot \dfrac{y-y_2}{y_3-y_2} = \dfrac{r_y(r_y+1)}{2} \end{cases} \quad (13)$$

Accordingly, the interpolation value of the pixel S(x, y) can be obtained by the matrix of Expression (14):

$$S(x,y) = \left( \dfrac{r_y(r_y-1)}{2} \quad -(r_y+1)(r_y-1) \quad \dfrac{r_y(r_y+1)}{2} \right) \quad (14)$$

$$\begin{pmatrix} S(1,1) & S(2,1) & S(3,1) \\ S(1,2) & S(2,2) & S(3,2) \\ S(1,3) & S(2,3) & S(3,3) \end{pmatrix} \begin{pmatrix} \dfrac{r_x(r_x-1)}{2} \\ -(r_x+1)(r_x-1) \\ \dfrac{r_x(r_x+1)}{2} \end{pmatrix}$$

Figure 8:
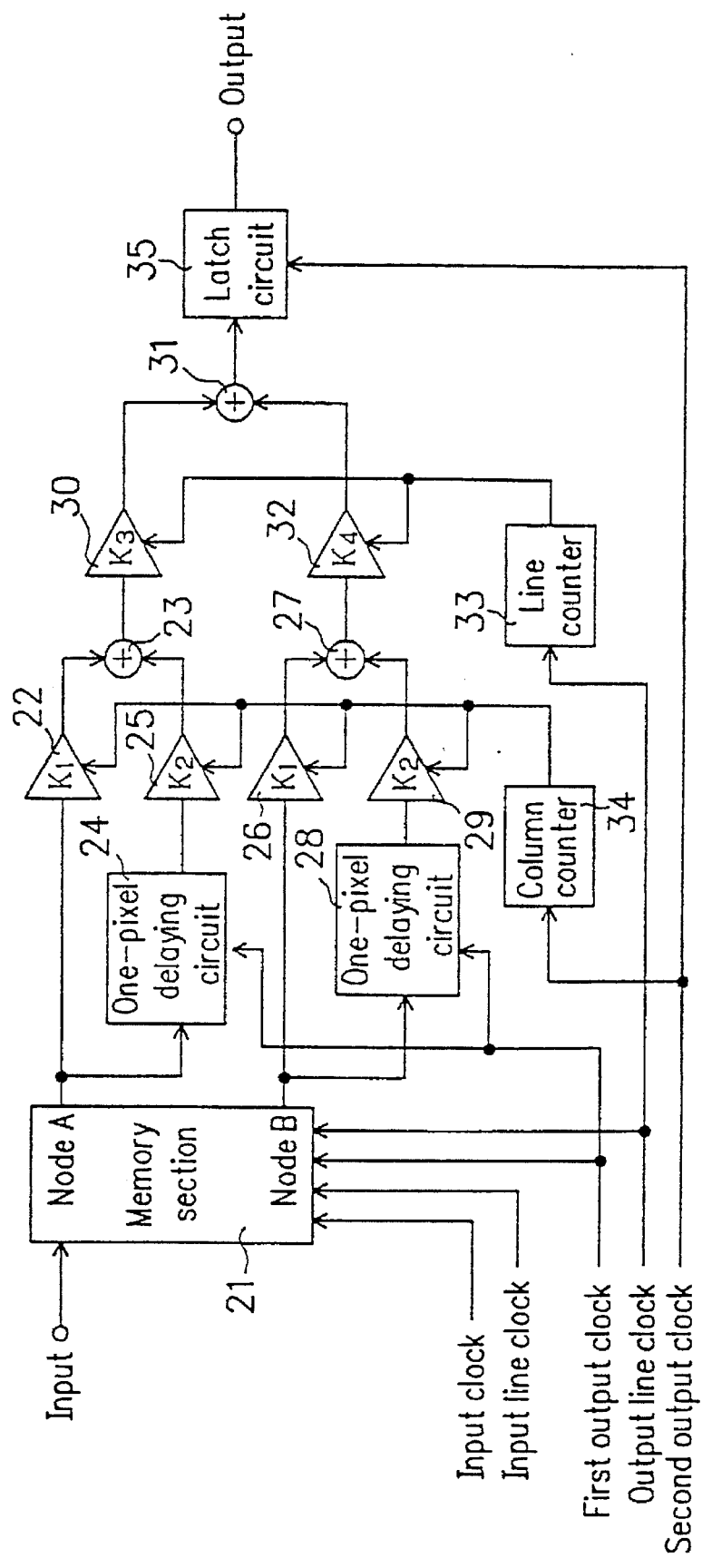
FIG. 8 is a block diagram showing a construction of an interpolation circuit in Example 1 according to the invention.

A specific construction for performing the abovedescribed linear Lagrangian polynomial interpolation in he interpolation processing section 9 and the pixel-number converting section 10 will be described. FIG. 8 shows an interpolation circuit which performs the operation of Expression (7). The operation of Expression (7) utilizes the sampling values of four adjacent pixels. That is, the operation of Expression (7) necessitates pixels delayed by one line from the pixels which are serially input, and pixels delayed by one pixel (column) from these pixels. Accordingly, the interpolation circuit includes a memory section 21 for delaying the pixels by one line and for lessening the difference in sampling rate between the input and the output caused by the interpolation. In the interpolation processing section 9 and the pixel-number converting section 10, an interpolation circuit is provided for an image signal of each color. Thus, any one of the image signals is serially input into the memory section 21.

The interpolation circuit receives an input clock, an input line clock, a first output clock, a second output clock, and an output line clock from a timing controller which is not shown. Among the clocks, the input clock, the input line clock, the first output clock, and the output line clock are input into the memory section 21. Each of the input clock and the input line clock is a signal in which each pixel and each line of the input image signal is regarded as one period. Each of the second output clock and the output line clock is a signal in which each pixel and each line of the image signal after the interpolation is regarded as one period. The first output clock is a signal in which each pixel when the input signal is interpolated only in the vertical direction is regarded as one period. Accordingly, in the case of the circuit in FIG. 8 being used as the interpolation circuit in the interpolation processing section 9, the frequency of the first output clock and the output line clock is twice as high as the frequency of the input clock and the input line clock, and the frequency of the second output clock is four times as high as the frequency of the input clock and the input line clock. In the case where the interpolation circuit is used in the pixel-number converting circuit, the frequencies are set in accordance with the format.

Figure 9:
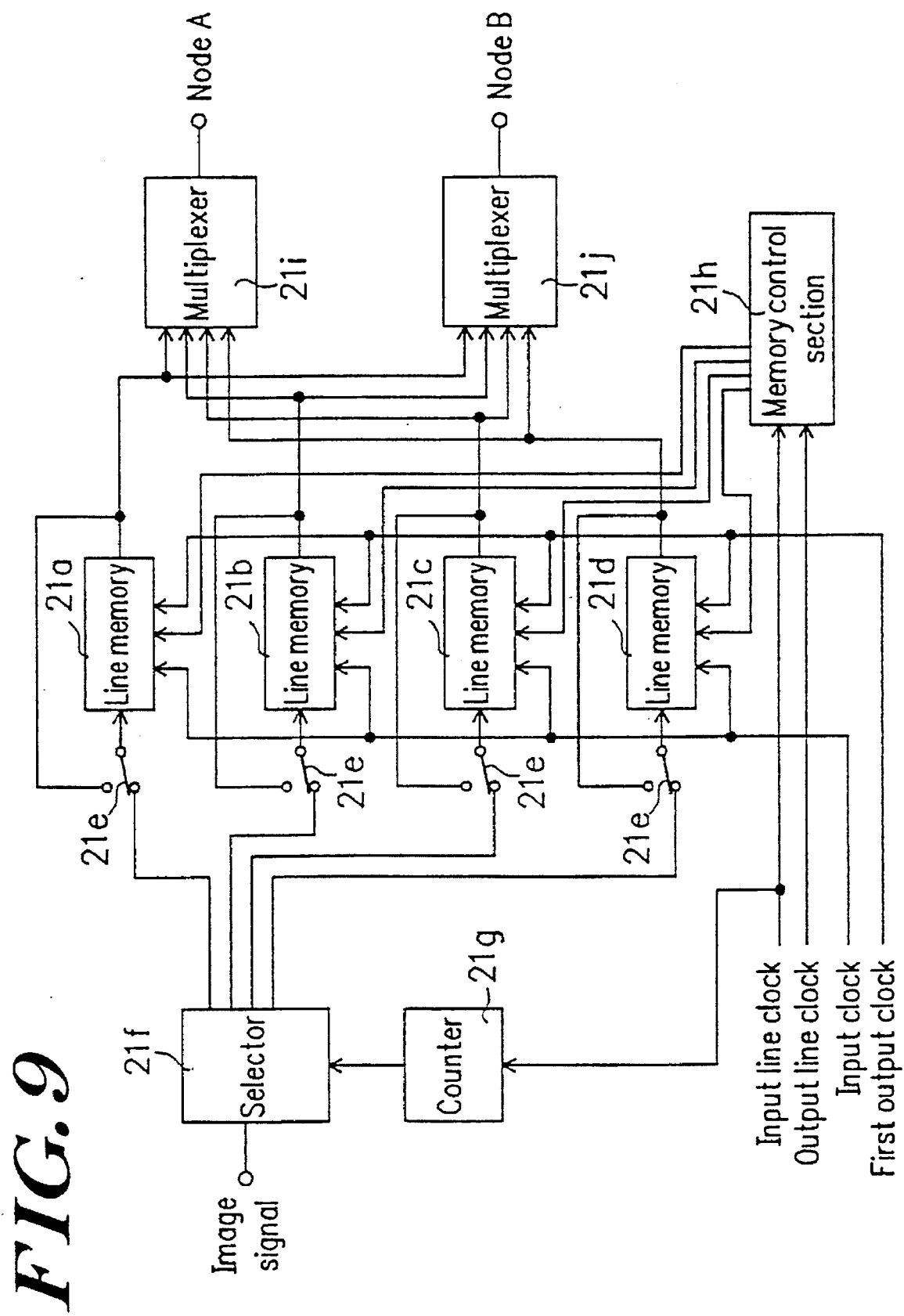
FIG. 9 is a block diagram showing a construction of a memory portion in Example 1 according to the invention.

As shown in FIG. 9, the memory section 21 includes four line memories 21a to 21d. Each of the line memories 21a to 21d is constituted by an FIFO (First-In First-Out) memory which stores input pixels for one line. The input of the pixels is performed in accordance with the input clock, and the output of the pixels is performed in accordance with the first output clock. In a conventional FIFO memory, the output data is lost. In order to repeatedly read the pixels in the same line, a feedback circuit is provided so as to input the output pixels again via a corresponding one of switch circuits 21e . . . in accordance with the first output clock. However, if each of the line memories 21a to 21d is constituted by a RAM and an input/output address control section, the repetitive reading can be performed by the address operation, so that such a feedback circuit is not required.

The pixels input into the memory section 21 are first fed to a selector 21f. The selector 21f sequentially selects the line memories 21a to 21d, in accordance with the output of a counter 21g which performs the count in quaternary notation by the input line clock. Then, the selector 21f sends the pixels to the selected one of the line memories 21a to 21d. A memory control section 21b performs the control so that the same one of the line memories 21a to 21d is selected based on the input line clock, so as to perform the input operation. Therefore, the pixels are input into the line memories 21a to 21d after the pixels are divided into respective lines.

The pixels output from the respective line memories 21a to 21d are output to the outside from a node A and a node B via two multiplexers 21i and 21j. The memory control section 21b selects two line memories among the line memories 21a to 21d excluding the line memory to which the input operation is performed, based on the output line clock. The selected two line memories are caused to perform the output operation of the pixels. The memory control section 21h also performs the control so as to switch the inputs of the multiplexers 21i and 21j, and to determine from which one of the node A and the node B the output pixels are to be output. Herein, the memory control section 21h selects the two of the line memories 21a to 21d in the order that the pixels are input. Then, the memory control section 21b performs the following control. In the case where the pixels read from one of the selected two of the line memories 21a to 21d are output to the node A via the multiplexer 21i, the other of the selected two of the line memories 21a to 21d always selects the pixels in the previous line, and the pixels read out from the other of the selected two of the line memories 21a to 21d are output to the node B via the multiplexer 21j. In the case of the circuit in FIG. 8 being used as the interpolation circuit in the interpolation processing section 9, except for the first line, the repetitive reading is performed twice from the respective line memories 21a to 21d. In the case of the circuit in FIG. 8 being used as the interpolation circuit in the pixel-number converting section 10, after the pixels for one line are read, whether the reading is performed again from the same one of the line memories 21a to 21d is determined in accordance with the format.

Accordingly, in the memory section 21, the input pixels are sequentially output at a rate corresponding to the first output clock from the node A and the node B. In addition, the pixels in the same line are repeatedly output, if necessary in the interpolation in the vertical direction. The pixels output from the node B are always delayed by one line from the pixels output from the node A.

Figure 10:
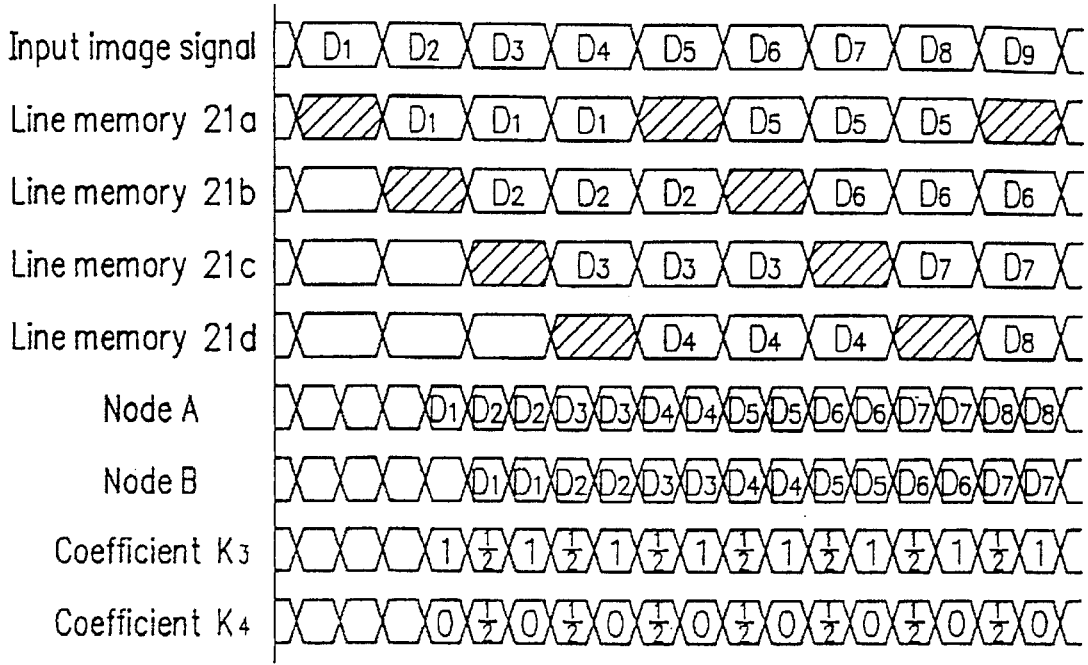
FIG. 10 is a timing diagram showing the operation of the memory portion in the case where it is used as an interpolation circuit of an interpolation processing portion in Example 1 according to the invention.

The operation of the memory section 21 in the case where the memory section 21 is used as the interpolation circuit in the interpolation processing section 9 will be described with reference to FIG. 10. In FIG. 10, image signals in each line are designated by D1, D2, ... with a numerical value which indicates the line number. A hatched portion indicates that the line memories 21a to 21d are in the input condition, and a blank portion indicates that the data is invalid.

The image signal D1 of the first line input into the memory section 21 is stored in the line memory 21a. The image signal D2 of the second line which is next input is stored in the line memory 21b. The image signals D3 and D4 of the third and fourth lines are similarly stored in the line memories 21c and 21d, respectively. When the image signal D5 of the fifth line is input, the stored contents of the line memory 21a are rewritten by the image signal D5. Thereafter, the same operation is repeated. From the node A, the image signal D1 of the first line is output once at a frequency which is twice as high as the input frequency, and the image signals D2, ... of the second and subsequent lines are repeatedly output twice. From the node B, the image signals D1 ... are repeatedly output twice after being delayed by one line from the outputs of the node A. Accordingly, in this case, except for the first line, the image signal in each line is output twice from the node A and the node B.

The operation of the memory section 21 in the case where the memory section 21 is used as the interpolation circuit in the pixel-number converting section 10 will be described with reference to FIG. 11. Also in FIG. 11, image signals D1, D2 ... and the like are designated similarly to those in FIG. 10. Herein, the case of the HD2 mode is exemplarily described. Accordingly, as for the number of lines, three lines are converted into four lines, so as to increase the number of lines from 768 to 1,024. The input operation to the respective line memories 21a to 21d is the same as that in the case of FIG. 10.

From the node A, first, the image signals D1 to D3 of the first line to the third line are successively output once, and then the image signal D4 of the fourth line is continuously output twice. After the fifth line, the same operation is repeatedly performed. From the node B, after being delayed by one line from the output of the node A, the image signals D1 and D2 of the first and second lines are successively output once, and then the image signal D3 of the third line is continuously output twice. Then, the image signal D4 of the fourth line is output once. After the fifth line, the same operation is repeatedly performed. Accordingly, in this case, except for the first line, when the image signals of three lines are output from the node A and the node B, an image signal of the same line as the previous line is output. The operation is repeatedly performed in a 4-line period.

As shown in FIG. 8, the pixels output from the node A of the memory section 21 are fed to an adder 23 via a coefficient unit 22, and also are fed to the adder 23 via a coefficient unit 25 after they are delayed by one pixel by a one-pixel delaying circuit 24. The pixels output from the node B are fed to an adder 27 via a coefficient unit 26, and also are fed to the adder 27 via a coefficient unit 29 after they are delayed by one pixel by a one-pixel delaying circuit 28. The output of the adder 23 is fed to an adder 31 via a coefficient unit 30, and the output of the adder 27 is also fed to the adder 31 via a coefficient unit 32. Herein, each of the coefficient units 22 and 25 is a circuit for multiplying an input value by a coefficient K1 shown in Expression (5), and each of the coefficient units 25 and 29 is a circuit for multiplying an input value by a coefficient K2. The coefficient unit 30 is a circuit for multiplying an input value by a coefficient K3 shown in Expression (6), and the coefficient unit 32 is a circuit for multiplying an input value by a coefficient K4. Accordingly, the output of the adder 31 is a value obtained as the interpolation value of the pixel $S(x, y)$ in accordance with the operation of the last equation in Expression (7).

The values of the coefficients K3 and K4 in the coefficient units 30 and 32 are varied in accordance with the output of a line counter 33 based on the output line clock, so that the coefficients K3 and K4 are switched when an image signal of one line is output from the nodes A and B. If the interpolation processing is performed for converting P lines into Q lines, the values of the coefficients K3 and K4 are varied at a period of R/P line, where R denotes the least common multiple of P and Q. The line counter 33 operates as a counter in a notation in which R/P is used as a basis. In the case of the use as the interpolation circuit in the interpolation processing section 9, one line is increased to be 2 lines, so that two lines constitute one period. As shown in FIG. 10, the value of the coefficient K3 is varied in such a manner that $1 \to 1/2 \to 1$, and the value of the coefficient K4 is varied in such a manner that $0 \to 1/2 \to 0$. In the case of the circuit in FIG. 8 being used as the interpolation circuit in the pixel-number converting section 10, and when three lines in the HD2 mode shown in FIG. 11 are converted into four lines, P=3, Q=4, and R=12, so that four lines constitute one period. As shown in FIG. 11, the value of the coefficient K3 is varied in such a manner that $1 \to 3/4 \to 1/2 \to 1/4 \to 1$, and the value of the coefficient K4 is varied in such a manner that $0 \to 1/4 \to 1/2 \to 3/4 \to 0$.

The values of the coefficients K1 and K2 of the coefficient units 22, 25, 26, and 29 are varied in accordance with the output of a column counter 34 based on the second output clock. Thus, there is a case where the values of the coefficients K1 and K2 are varied plural times for one pixel output from the nodes A and B in the interpolation in the horizontal direction. If the coefficients K1 and K2 are used for converting the number of pixels in each line from M pixels into N pixels in the horizontal direction, the values of the coefficients K1 and K2 are varied at a period of K/M line, where K denotes the least common multiple of M and N. The column counter 34 operates as a counter in a notation in which K/M is used as a basis. In the case of the circuit in FIG. 8 being used as the interpolation circuit in the interpolation processing section 9, the number of pixels Is increased from 1 to 2, so that two pixels constitute one period. The value of the coefficient K1 is varied in such a manner that $1 \to 1/2 \to 1$, and the value of the coefficient K2 is varied in such a manner that $0 \to 1/2 \to 0$. When the value of the coefficient K1 is 1, the value of the coefficient K3 is also 1, and the values of the coefficients K2 and K4 are 0. Thus, the sampling values of the pixels output from the node A are directly output from the adder 31. This indicates that a pixel is formally interpolated at a position having a distance of zero from the real pixel by the interpolation circuit. When the values of the coefficients K1 and K2 are ½, the interpolation is actually performed, and the interpolation value of the interpolated pixel is output from the adder 31. In the case of the circuit in FIG. 8 being used as the interpolation circuit in the pixel-number converting section 10, the values of the coefficients K1 to K4 are varied at a period in accordance with the format.

The value output from the adder 31 is latched by a latch circuit 35 based on the second output clock. A signal which is output from the latch circuit 35 in a synchronous manner with the second output clock is the output of the interpolation circuit. Accordingly, in the interpolation processing section 9, the interpolation circuit performs the interpolation processing for increasing the number of pixels to be four times, i.e., twice In the vertical direction and twice in the horizontal direction. On the other hand, in the pixel-number converting section 10, the interpolation circuit performs the pixel-number converting processing which is variously selected in accordance with the output format. Therefore, the case of the general pixel-number converting processing which uses the interpolation circuit shown in FIG. 8 will be described in more detail with reference to FIG. 12.

Herein, for simplicity, the case where an image having 8 pixels in the horizontal direction and 6 pixels in the vertical direction is converted into an image having 6 pixels in the horizontal direction and 4 pixels in the vertical direction will be described. Respective pixels S(1, 1) to S(8, 6) of the input signal are indicated by circles, and respective pixels Sm(1, 1) to Sm(6, 4) of the output signal are indicated by hatched triangles. Herein, fIH denotes a frequency of the input clock, and fIV denotes a frequency of the input line clock. In addition, fOH denotes a frequency of the second output clock, and fOV denotes a frequency of the output line clock.

Figure 12:
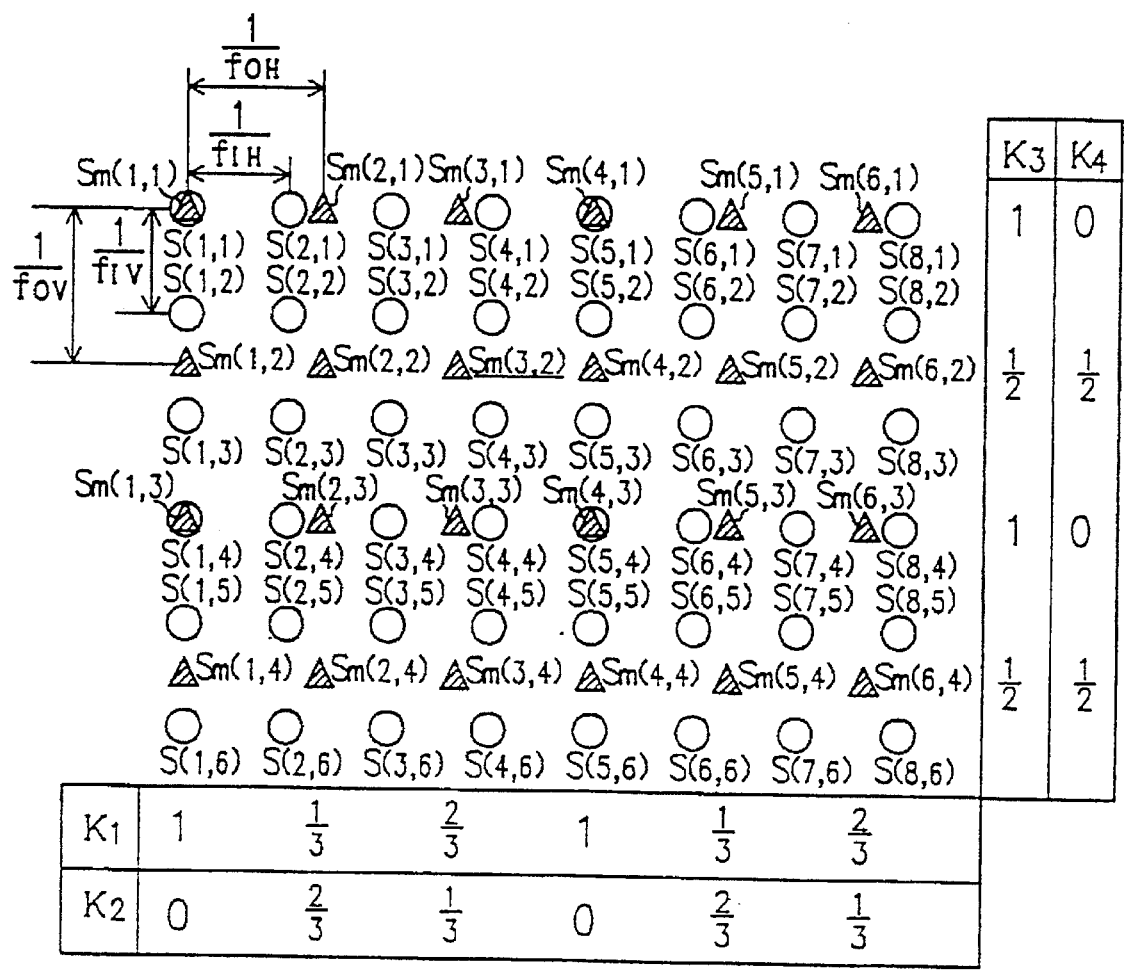
FIG. 12 is a diagram showing pixels which are used for general pixel-number converting processing by the interpolation circuit in Example 1 according to the invention.

In FIG. 12, the values of the coefficients K1 and K2 for each column of the pixels Sm(1, 1) to Sm(6, of the output signals are shown in the lower end portion of the figure. Herein, the values of M, N, and K are set to be 8, 6, and 24, so that the values are varied at a period of K/M, i.e., 3 pixels. In the right end portion of the figure; the values of the coefficients K3 and K4 for each line of the pixels Sm(1, 1) to Sm(6, 4) of the output signals are shown. Herein, the values of P, Q, and R are set to be 6, 4, and 12, so that the values are varied at a period of R/P, i.e., 2 lines.

The sampling value of the pixel Sm(3, 2) in FIG. 12 is, for example, obtained by the operation of Expression (15):

$$Sm(8,2)=K_3(K_1S(4,2)+K_2S(3,2))+K_4(K_1S(4,3)+K_2S(3,3))=\frac{1}{2}(\frac{2}{3}S(4,2)+\frac{1}{3}S(3,2)+\frac{1}{2}(\frac{2}{3}S(4,3)+\frac{1}{3}S(3,3)) \qquad (15)$$

Figure 11:
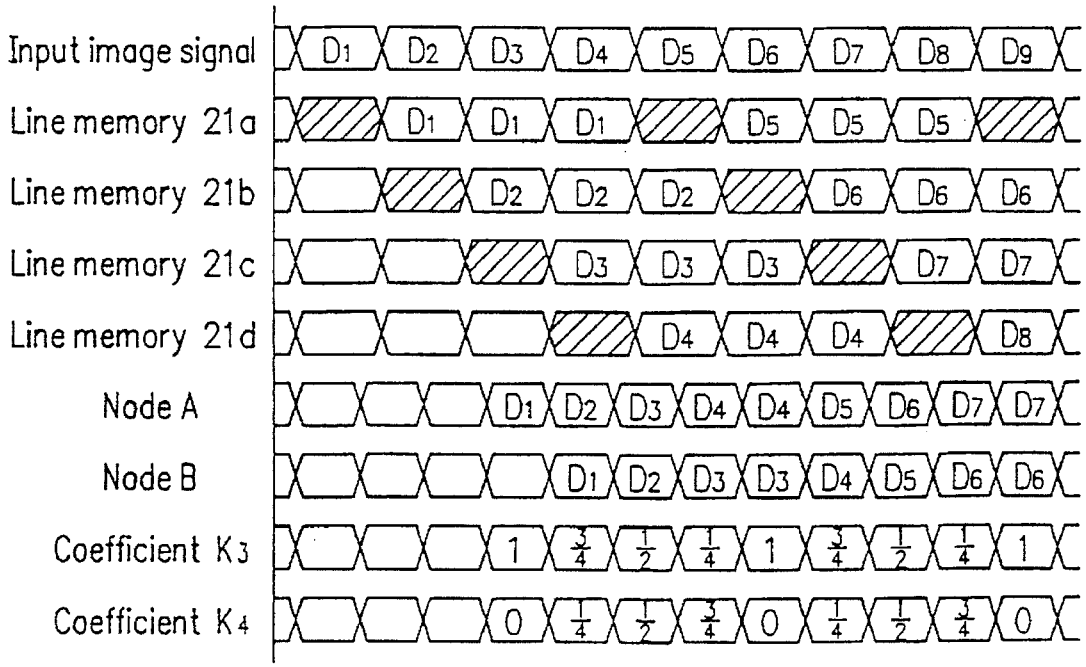
FIG. 11 is a timing diagram showing the operation of the memory portion in the case where it is used as an interpolation circuit of a pixel-number conversion portion in Example 1 according to the invention.

Accordingly, although FIG. 11 only shows the conversion of the number of lines in the HD2 mode, the processing for converting the number of pixels in each line from 1,440 to 1,008 can be performed by appropriately determining the values of the coefficients K1 and K2. Thus, the pixel-number converting processing in the HD2 mode can be also performed.

The operation processing by the above-described interpolation circuit is implemented by the hardware shown in FIG. 8, but part of or all of the processing dan be implemented by software.

The linear Lagrangian polynomial interpolation used in the interpolation circuit may disadvantageously cause color variations in an edge portion in an oblique direction of the image, when the interpolation is performed between pixels in the same line or between pixels in the same column. However, when the interpolation circuit shown in FIG. 8 is configured based on the matrix of the quadratic Lagrangian polynomial interpolation shown in Expression (14), the color variations can be suppressed. Similarly to the case shown in FIG. 8, the interpolation circuit can be easily configured by developing the matrix of Expression (14) and combining coefficient units With adders in accordance with the developed result. It is also possible to configure an interpolation circuit which utilizes the third-degree or higher-degree of Lagrangian polynomial interpolation by using the matrix shown in Expression (4).

Figure 13:
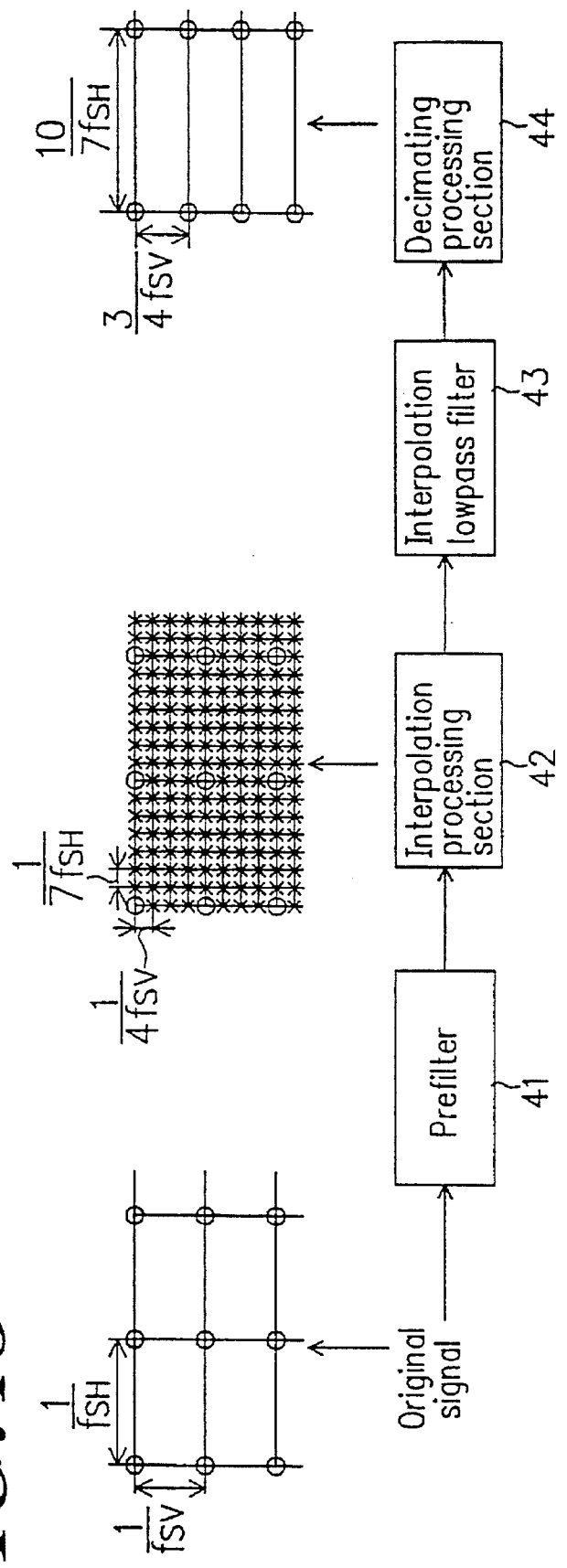
FIG. 13 is a diagram for illustrating the pixel-number converting processing by digital-to-digital conversion in Example 1 according to the invention.

The interpolation circuit can utilize another interpolation method instead of the Lagrangian polynomial interpolation. Since the pixel-number converting processing in the pixel-number converting section 10 is the same processing as that in the converting processing in the conventional television system, the pixel-number converting processing is generally performed by digital-to-digital conversion. The pixel-number converting processing by the digital-to-digital conversion will be described with reference to FIG. 13. Herein, the pixel-number converting processing in which the number of pixels in the horizontal direction is converted from 1,440 to 1,008, and the number of pixels in the vertical direction is converted from 768 to 1,024 in the HD2 mode will be exemplarily described. That is, the number of pixels is decreased from every 10 to 7 in the horizontal direction, and the number of lines is increased from every 3 to 4 in the vertical direction.

As for the original signal before the conversion, a horizontal spatial sampling frequency is denoted by fSH, and a vertical spatial sampling frequency is denoted by fSV, as shown in the figure. First, the original signal is input into a prefilter 41. The prefilter 41 is a lowpass filter for previously limiting the band so that aliasing distortion may not be caused after the pixel-number conversion.

Next, in an interpolation processing section 42, Six pixels each having a sampling value of 0 are interpolated between pixels in the horizontal direction, and three lines only including pixels each having a sampling value of 0 are interpolated between lines in the vertical direction. That is, over-sampling is performed in such a manner that the horizontal spatial sampling frequency is increased to be 7 times, i.e., 7fSH, and the vertical spatial sampling frequency is increased to be 4 times, i.e., 4fSV. After the interpolation, the frequency spectrum of the original signal is not changed. The Nyquist frequency on the frequency spectrum is increased to be 7fSH/2 in the horizontal direction and increased to be 4fSV/2 in the vertical direction. As a result, unwanted frequency components are caused in a frequency band exceeding fSH/2 and fSV/2 of the original Nyquist frequency. If the signal is allowed to pass through an interpolation lowpass filter 43 which is a lowpass filter having cutoff frequencies of the horizontal spatial frequency fSH/2 and the vertical spatial frequency fSV/2, the undesired frequency components can be removed. In this way, the sampling value of each pixel which is previously inserted is interpolated. In a decimating processing section 44, one pixel is decimated out of ten pixels in the horizontal direction and one pixel is decimated out of three pixels in the vertical direction from the interpolated signal. As a result, it is possible to obtain a signal in which the horizontal spatial sampling frequency is converted into (7/10)fSH and the vertical spatial sampling frequency is converted into (4/3) fSV.

However, such processing requires over-sampling by using a high frequency of a least common multiple of a frequency before the conversion and a frequency after the conversion. In addition, the filtering processing by the prefilter 41 and the interpolation lowpass filter 43 is the processing for multiplying a plurality of preceding and succeeding pixels by a filter coefficient, respectively, and for adding the multiplied values. Therefore, the number of pixels preceding and succeeding to each pixel is increased in accordance with the degrees of the filters 41 and 43, and the number of pixels is also increased by the interpolation. As a result, a large amount of operation is required, so that the processing can be time consuming in terms of the operation rate.

Accordingly, in this preferred example, Lagrangian polynomial interpolation is used so as to reduce the amount of calculation. Alternatively, the amount of calculation can be greatly reduced in the following method. The filtering processing by the prefilter 41 and the interpolation lowpass filter 43 is performed only once, and the filter coefficient is supplied to the original pixels excluding the interpolated pixels each having the sampling value of 0. Such an operation can attain the same effects as those by the case of the Lagrangian polynomial interpolation in which the filter coefficient corresponds to the degree of the Lagrangian polynomial.

As described above, according to the imaging apparatus of this example, it is possible to enhance the resolution of image signals by using inexpensive CCD imaging devices 3 to 5 each having the standard number of pixels by the spatial oblique offset-site pick up method. As compared with the imaging device including the large number of pixels, each pixel of the CCD imaging devices 3 to 5 receives a large amount of light, so that it is possible to enhance the sensitivity and the dynamic range. In addition, the pixel-number converting processing and the aspect-ratio converting processing for the image signals of high resolution are performed in the pixel-number converting section 10, so that it is possible to desirably select and output image signals of one of four kinds of formats, for example.

Moreover, in the case where the interpolation processing in the interpolation processing section 9 is performed by the linear Lagrangian polynomial interpolation, the operation processing is easily performed, and the apparatus can be inexpensive. In the case where the interpolation processing the interpolation processing section 9 is performed by quadratic or higher-degree Lagrangian polynomial interpolation, it is possible to suppress the color variations in an oblique edge portion of the image which is the drawback of the spatial oblique offset-site pick up method. The pixel-number converting processing in the pixel-number converting section 10 is performed by the linear, quadratic, or higher-degree Lagrangian polynomial interpolation in which the operation processing is easy, so that the apparatus can be inexpensive.

EXAMPLE 2

Figure 14:
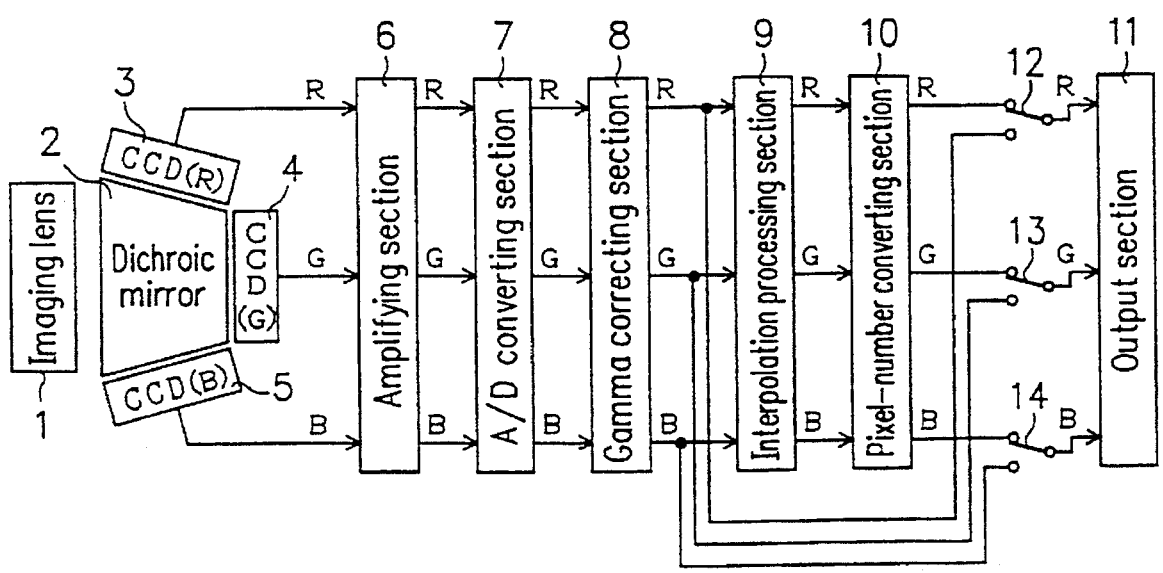
FIG. 14 is a block diagram showing a construction of an imaging apparatus in Example 2 according to the invention.
Figure 15:
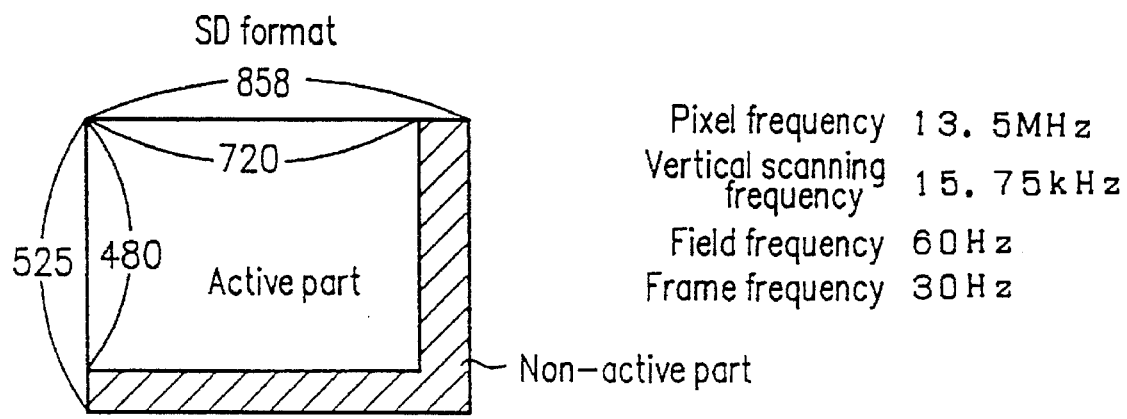
FIG. 15 is a diagram showing the specifications of an SD format.
Figure 16:
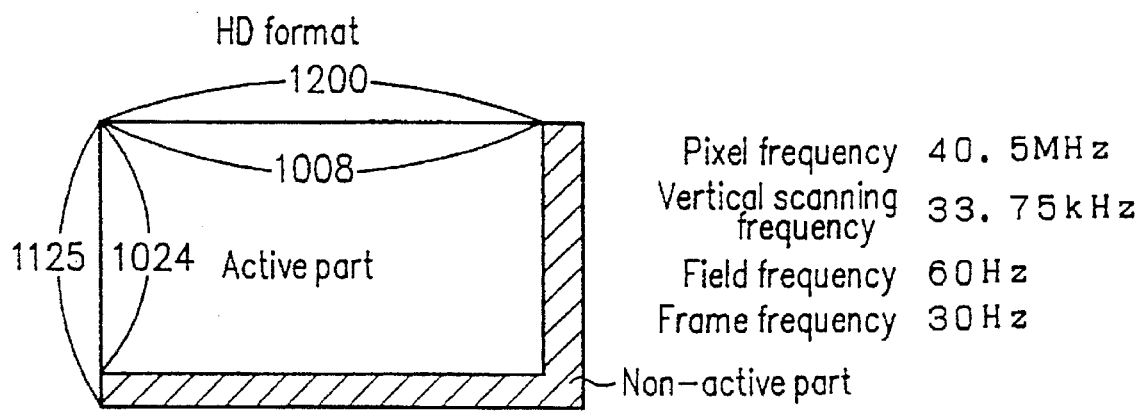
FIG. 16 is a diagram showing the specifications of an HD format.
Figure 17:
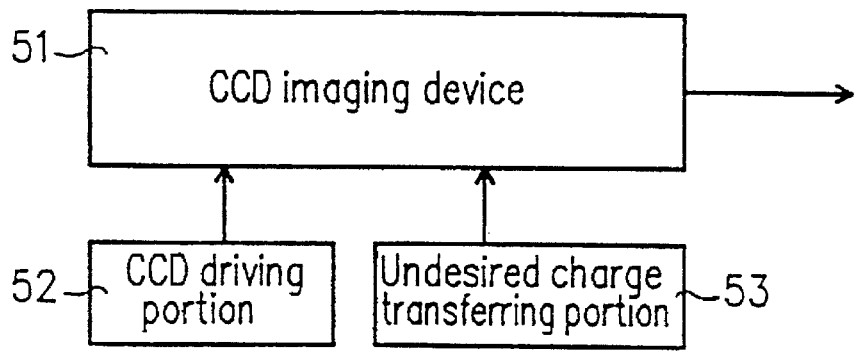
FIG. 17 is a block diagram showing a construction of an imaging apparatus in a prior art.
Figure 18:
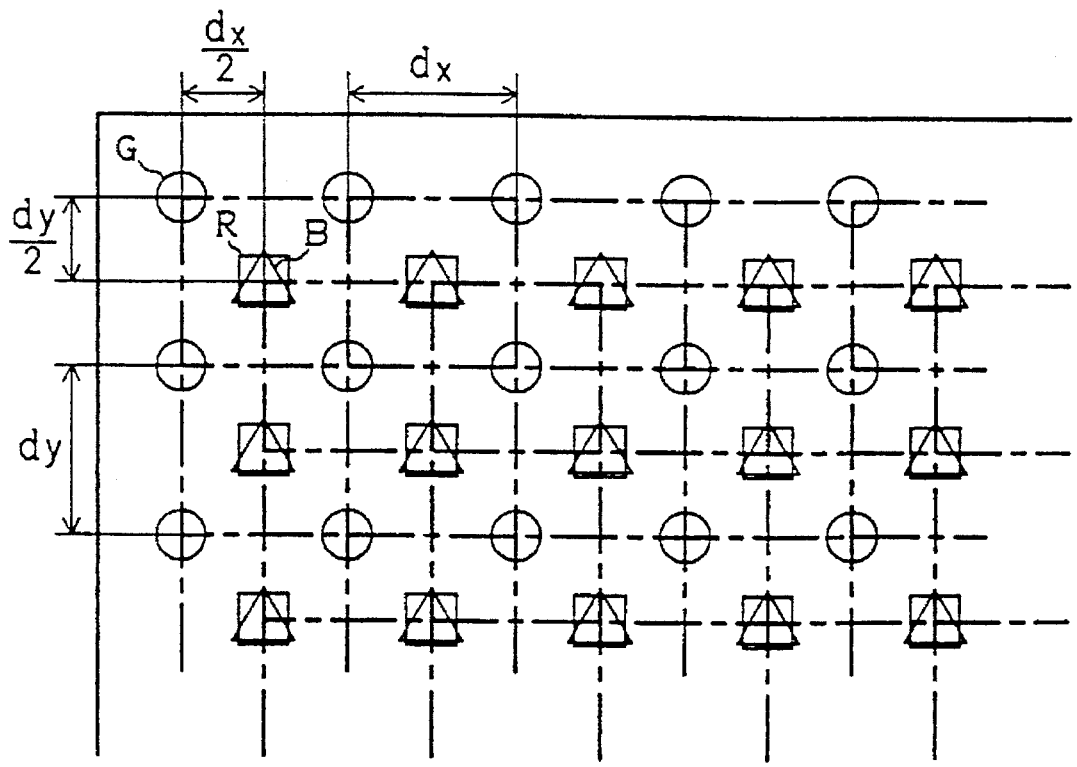
FIG. 18 is a diagram showing the arrangement of pixels in each CCD imaging device by the spatial oblique offset-site pick up method in the prior art.

FIG. 14 shows a second example of the invention, and is a block diagram showing the construction of an imaging apparatus. Components having the same functions as those in the first example shown in FIG. 1 are designated by identical reference numerals, In this example, output selectors 12 to 14 are additionally provided in the imaging apparatus of the first example shown in FIG. 1. The output selectors 12 to 14 are used for selectively connecting the output of the gamma correcting section 8 or the output of the pixel-number converting section 10 to the input of the output section 11. When the output selectors 12 to 14 are connected to the output of the pixel-number converting section 10 as shown in FIG. 14, the construction is the same as that of the first example. However, in the SD mode, the output selectors 12 to 14 are connected to the output of the gamma correcting section 8. Then, the image signals of respective colors output from the gamma correcting section 8 can be directly input into the output section 11 without passing through the interpolation processing section 9 and the pixel-number converting section 10. The SD mode is the same format as that of the image signal having 720 pixels in the horizontal direction and 480 pixels in the vertical direction which is output from the CCD imaging devices 3 to 5. Therefore, in the SD mode, if the output section 11 adds and averages the pixels in two lines in the same way as in the HD1 mode shown in FIG. 4, image signals by interlace scanning can be output.

In the still mode, the pixel-number converting processing in the pixel-number converting section 10 is not performed. Accordingly, the signals after the interpolation processing in the interpolation processing section 9 can be directly sent to the output section 11 using the output selectors 12 to 14. Alternatively, the signals output from the gamma correcting section 8 can be directly sent to the pixel-number converting section 10 so that the interpolation processing in the interpolation processing section 9 is not performed, but the pixel-number converting processing and the like in the pixel-number converting section 10 are performed.

As described above, according to the imaging apparatus of this example, in the SD mode, an offset by ½ pixel is caused between the green image signal and the red and blue image signals. However, waste operations of performing the interpolation processing in the interpolation processing section 9 and the decimating processing in the pixel-number converting section 10 can be omitted. Thus, it is possible to reduce the deterioration of signals. In addition, by using the output selectors 12 to 14, it is possible to widen the variation of formats which can be output.

As is apparent from the above description, according to the invention, it is possible to obtain image signals of high resolution in accordance with a plurality of formats by using inexpensive imaging portions having high sensitivity. Therefore, it is unnecessary to use different imaging apparatuses for respective formats, so that it is possible to obtain an imaging apparatus with high versatility.

The operation processing is easily performed by using Lagrangian polynomial interpolation in the interpolation processing and in the pixel-number converting processing, so that the increase in production cost of the imaging apparatus can be reduced. In addition, the quadratic or higher-degree of Lagrangian polynomial interpolation is used for the interpolation processing, so that it is possible to suppress the color variations which may be caused in the oblique edge portion of the image by the spatial oblique offset-site pick up method.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An imaging apparatus for outputting video signals in a plurality of formats, the imaging apparatus comprising:

a color separating optical system for separating incident image light into light beams of primary colors;

a first imaging portion including a first set of a plurality of pixels arranged at intervals of Ph (Ph is a positive real number) in a first direction and at intervals of Pv (Pv is a positive real number) in a second direction which is perpendicular to the first direction, the first imaging portion receiving one of the light beams of the primary colors separated by the color separating optical system and accumulating the received light beam in the first set of the plurality of pixels as an image signal;

a second imaging portion and a third imaging portion including a second set of the plurality of pixels and a third set of the plurality of pixels arranged at intervals of Ph in the first direction and at intervals of Pv in the second direction, respectively, the second and third sets of the plurality of pixels being shifted by Ph/2 pitch with respect to the first set of the plurality of pixels in the first direction and shifted by Pv/2 pitch with respect to the first set of the plurality of pixels in the second direction, the second and third imaging portions receiving the remaining two light beams of the primary colors separated by the color separating optical system and accumulating the received light beams in the second and third sets of the plurality of pixels, respectively, as image signals;

an A/D converting section for converting the image signals of the primary colors accumulated in the first, second, and third sets of the plurality of pixels into digital signals;

an interpolation processing section for performing interpolation processing on the image signals of the primary colors which are converted into the digital signals in the A/D converting section, thereby doubling the number of pixels in the first direction and doubling the number of pixels in the second direction; and a pixel-number converting section for performing format converting processing for converting the image signals of the primary colors which are interpolated in the interpolation processing section into image signals based on any one of the plurality of formats.

2. An imaging apparatus according to claim 1, wherein the pixel-number converting section performs at least one of processing for converting the number of pixels in the first and second directions, and processing for converting an aspect ratio of an image by trimming or by adding a predetermined signal to an outside of an image area represented by the first, second, and third sets of the plurality of pixels, thereby performing the format converting processing for converting the image signals of the primary colors into the image signals based on any one of the plurality of formats.

3. An imaging apparatus according to claim 2, wherein the interpolation processing section performs the interpolation processing by using a linear Lagrangian polynomial.

4. An imaging apparatus according to claim 2, wherein the interpolation processing section performs the interpolation processing by using a quadratic Lagrangian polynomial.

5. An imaging apparatus according to claim 2, wherein the interpolation processing section performs the interpolation processing by using a third-degree or higher-degree of Lagrangian polynomial.

6. An imaging apparatus according to claim 2, wherein the pixel-number converting section performs the processing for converting the number of pixels by using a Lagrangian polynomial.

7. An imaging apparatus according to claim 6, wherein the pixel-number converting section includes:
pixel supplying means for sequentially supplying pixels in each line as specific pixels from among pixels arranged along the first direction in respective lines which are successively disposed in the second direction and for supplying n x (n+2) delayed pixels for each of the specific pixels, the n x (n+2) delayed pixels including n delayed pixels which are delayed by 1 to n lines, respectively, with respect to the specific pixel, and n x (n+1) delayed pixels which are delayed by 1 column to n columns, respectively, with respect to the n delayed pixels which are delayed by 1 line to n lines, n being an integer of 2 or more;

operation means for obtaining interpolation pixels by using n-degree of Lagrangian polynomial by multiplying the specific pixel and delayed pixels for the specific pixel by coefficients, respectively, and by adding the multiplied pixels; and coefficient supplying means for supplying the respective coefficients to the operation means at a predetermined period.

8. An imaging apparatus according to claim 2, further comprising:
at least one selection means for determining whether or not the interpolation processing is to be performed in the interpolation processing section for the image signals of the primary colors which are converted into the digital signals in the A/D converting section, and for determining whether or not the format converting processing is to be performed in the pixel-number converting section for the image signals of the primary colors which are interpolated in the interpolation processing section.

9. An imaging method for outputting video signals in a plurality of formats, the imaging method comprising the steps of:
separating incident image light into light beams of primary colors;

accumulating one of the separated light beams of the primary colors in a first set of a plurality of pixels arranged at intervals of Ph (Ph is a positive real number) in a first direction and at intervals of Pv (Pv is a positive real number) in a second direction which is perpendicular to the first direction, as an image signal;

accumulating the remaining two of the separated light beams of the primary colors in a second set of the plurality of pixels and a third set of the plurality of pixels arranged at intervals of Ph in the first direction and at intervals of Pv in the second direction, respectively, the second and third sets of the plurality of pixels being shifted by Ph/2 pitch with respect to the first set of the plurality of pixels in the first direction and shifted by Pv/2 pitch with respect to the first set of the plurality of pixels in the second direction, as image signals;

A/D converting the image signals of the primary colors accumulated in the first, second, and third sets of the plurality of pixels into digital signals;

performing interpolation processing on the image signals of the primary colors which are converted into the digital signals, thereby doubling the number of pixels in the first direction and doubling the number of pixels in the second direction; and performing format converting processing for converting the interpolated image signals of the primary colors into image signals based on any one of the plurality of formats.

10. An imaging method according to claim 9, wherein the step of performing the format converting processing includes at least one of processing for converting the number of pixels in the first and second directions, and processing for converting an aspect ratio of an image by trimming or by adding a predetermined signal to an outside of an image area represented by the first, second, and third sets of the plurality of pixels.

11. An imaging method according to claim 10, wherein the step of performing the interpolation processing performs the interpolation processing by using a linear Lagrangian polynomial.

12. An imaging method according to claim 10, wherein the step of performing the interpolation processing performs the interpolation processing by using a quadratic Lagrangian polynomial.

13. An imaging method according to claim 10, wherein the step of performing the interpolation processing performs the interpolation processing by using a third-degree or higher-degree of Lagrangian polynomial.

14. An imaging method according to claim 10, wherein the step of performing the format converting processing performs the processing for converting the number of pixels by using a Lagrangian polynomial.

15. An imaging method according to claim 14, wherein the step of performing the format converting processing includes:

a pixel supplying step of sequentially supplying pixels in each line among pixels arranged along the first direction in respective lines which are successively disposed in the second direction, as specific pixels, and of supplying nx(n+2) delayed pixels for each of the specific pixels, the nx(n+2) delayed pixels including n delayed pixels which are delayed by 1 line to n lines, respectively, with respect to the specific pixel, and nx(n+1) delayed pixels which are delayed by 1 column to n columns, respectively, with respect to the n delayed pixels which are delayed by 1 line to n lines;

an operation step of obtaining interpolation pixels by using n-degree of Lagrangian polynomial by multiplying the specific pixel and the delayed pixels for the specific pixel by coefficients, respectively, and by adding the multiplied pixels; and a coefficient supplying step of supplying the respective coefficients to the interpolated pixels at a predetermined period.

16. An imaging method according to claim 10, further comprising:

at least one step selected from the step of determining whether the interpolation processing is to be performed in the step of performing the interpolation processing or not for the image signals of the primary colors which are converted into the digital signals in the A/D converting step, and the step of determining whether the format converting processing is to be performed in the step of performing the format converting processing or not for the image signals of the primary colors which are interpolated in the step of performing the interpolation processing.

* * * * *